United States Patent
Kedalagudde et al.

(10) Patent No.: US 12,532,220 B2
(45) Date of Patent: Jan. 20, 2026

(54) WIRELESS LOCAL AREA NETWORK ENHANCEMENTS FOR ACCESS TRAFFIC STEERING SWITCHING SPLITTING

(71) Applicant: Intel Corporation, Santa Clara, CA (US)

(72) Inventors: Meghashree Dattatri Kedalagudde, Portland, OR (US); Binita Gupta, San Diego, CA (US); Shu-ping Yeh, Campbell, CA (US); Jingwen Bai, San Jose, CA (US); Jing Zhu, Portland, OR (US); Necati Canpolat, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 486 days.

(21) Appl. No.: 17/922,947

(22) PCT Filed: Jun. 25, 2021

(86) PCT No.: PCT/US2021/039252
§ 371 (c)(1),
(2) Date: Nov. 2, 2022

(87) PCT Pub. No.: WO2022/005917
PCT Pub. Date: Jan. 6, 2022

(65) Prior Publication Data
US 2023/0300674 A1    Sep. 21, 2023

Related U.S. Application Data

(60) Provisional application No. 63/047,587, filed on Jul. 2, 2020, provisional application No. 63/047,518, filed
(Continued)

(51) Int. Cl.
H04W 28/08    (2023.01)
H04W 28/086   (2023.01)

(52) U.S. Cl.
CPC ..... H04W 28/086 (2023.05); H04W 28/0958 (2020.05)

(58) Field of Classification Search
CPC . H04W 24/10; H04W 28/0958; H04W 24/02; H04W 28/086; H04W 28/0273; H04W 76/16
See application file for complete search history.

(56) References Cited

U.S. PATENT DOCUMENTS

2019/0306752 A1    10/2019  Lai
2019/0394833 A1    12/2019  Talebi Fard et al.
(Continued)

OTHER PUBLICATIONS

3GPP, "Technical Specification Group Services and System Aspects; Service requirements for the 5G system; Stage 1 (Release 17)," 3GPP TS 22.261 V17.2.0 (Mar. 2020), 5G, 83 pages.
(Continued)

Primary Examiner — Anez C Ebrahim
(74) Attorney, Agent, or Firm — Schwegman Lundberg & Woessner, P.A.

(57) ABSTRACT

Some embodiments may relate to incorporating RAN measurements when determining traffic distribution for access traffic steering switching splitting (ATSSS) systems. Other embodiments may be disclosed and/or claimed.

21 Claims, 14 Drawing Sheets

Related U.S. Application Data on Jul. 2, 2020, provisional application No. 63/046,882, filed on Jul. 1, 2020.

(56) References Cited

U.S. PATENT DOCUMENTS

| | | | |
|---|---|---|---|
| 2020/0045612 A1 | 2/2020 | Stauffer et al. | |
| 2020/0178196 A1 | 6/2020 | Wang et al. | |
| 2020/0178352 A1* | 6/2020 | Cho | H04L 41/5096 |
| 2021/0282060 A1* | 9/2021 | Schmidt | H04W 36/0033 |
| 2023/0035455 A1 | 2/2023 | Ma et al. | |
| 2023/0072769 A1 | 3/2023 | Yeh et al. | |
| 2023/0132058 A1* | 4/2023 | Youn | H04L 12/14 370/329 |
| 2023/0199560 A1* | 6/2023 | Nuggehalli | H04W 28/0917 455/450 |
| 2024/0259857 A1 | 8/2024 | Zhu et al. | |

OTHER PUBLICATIONS

International Search Report and Written Opinion mailed Nov. 19, 2021 for International Patent Application No. PCT/US2021/039252, 13 pages.

3GPP, "T3rd Generation Partnership Project; Technical Specification Group Services and System Aspects; Study on access traffic steering, switch and splitting support in the 5G system architecture (Release 16)", 3GPP TR 23.793 V16.0.0, (Dec. 19, 2018), 114 pages.

"Japanese Application Serial No. 2022-573639, Notification of Reasons for Rejection mailed Aug. 5, 2025", W English Translation, 7 pgs.

"3GPP TSG CT #88e CP-201229", CT3, CRPackl on ATSSS, (Jun. 19, 2020), 102 pgs.

Huawei, "3GPP TSG SA WG2 #128BIS S2-188059", Update of solution 3, (Aug. 14, 2018), 19 pgs.

Huawei, "3GPP TSG SA WG2 #137e S2-2002218", Support MA PDU Session in ETSUN sce nario, (Feb. 18, 2020) 8 pgs.

Nokia, Shanghai Bell, "3GPP TSG SA WG2 #128 S2-186569", (Jun. 26, 2018) 18 pgs.

"Japanese Application Serial No. 2022-573639, Response filed Oct. 30, 2025 to Notification of Reasons for Rejection mailed Aug. 5, 2025", w English Claims, 8 pgs.

* cited by examiner

WIRELESS LOCAL AREA NETWORK ENHANCEMENTS FOR ACCESS TRAFFIC STEERING SWITCHING SPLITTING

CROSS REFERENCE TO RELATED APPLICATIONS

The present application is a national phase entry under 35 U.S.C. § 371 of International Application No. PCT/US2021/039252, filed Jun. 25, 2021, entitled "WIRELESS LOCAL AREA NETWORK ENHANCEMENTS FOR ACCESS TRAFFIC STEERING SWITCHING SPLITTING", which claims priority to U.S. Provisional Patent Application No. 63/046,882, which was filed Jul. 1, 2020; U.S. Provisional Patent Application No. 63/047,518, which was filed Jul. 2, 2020, and U.S. Provisional Patent Application No. 63/047,587, which was filed Jul. 2, 2020. The applications are hereby incorporated by reference in their entireties for all purposes, except for those sections, if any, that are inconsistent with this application.

FIELD

Various embodiments generally may relate to the field of wireless communications. For example, some embodiments may relate to incorporating RAN measurements when determining traffic distribution for access traffic steering switching splitting (ATSSS) systems.

BACKGROUND

The access traffic steering switching splitting (ATSSS) feature enables UEs to simultaneously connect to both 3GPP access and non-3GPP access. To take full advantage of both accesses, the 5G system should be able to distribute traffic across two accesses in a manner that improves user experience with efficient radio resource usage. RAN measurement can provide information such as radio link quality, delay statistics, etc., that can be used for the 5G system to compare different radio access technologies when determining how traffic should be distributed across accesses. Several emerging applications and business models can benefit from judicious use of both 3GPP access and non-3GPP access based on their radio characteristics:

- In an enterprise managed network that includes both 3GPP and non-3GPP access, there can be multiple UEs simultaneously connecting to both accesses. Radio efficiency and rate/latency performance can be improved by jointly considering how traffic flows for multiple UEs should be distributed across available accesses. For example, with radio quality information, 5G system can deprioritize a poorer radio quality RAT of a UE for distributing traffic. An enterprise managed 5G network can collect radio quality distribution of all UEs over both 3GPP and non-3GPP access to determine traffic distribution rules that improve network-wise radio usage and user experience.
- 5G systems promises to support various new applications [TS 22.261, v. 17.2.0, 2020 Mar. 27]. Many of them, such as AR/VR and cloud gaming, demands low latency transmission and high data rate. With ATSSS, more spectrum bandwidth resources become available to support those novel applications. In addition, for new applications with user experience that is sensitive to latency, 5G system can benefit from recent RAT measurements that reflect current radio usage condition to timely steer traffic away from poor link to avoid broken link or excess delay.

DETAILED DESCRIPTION

Figure 1:
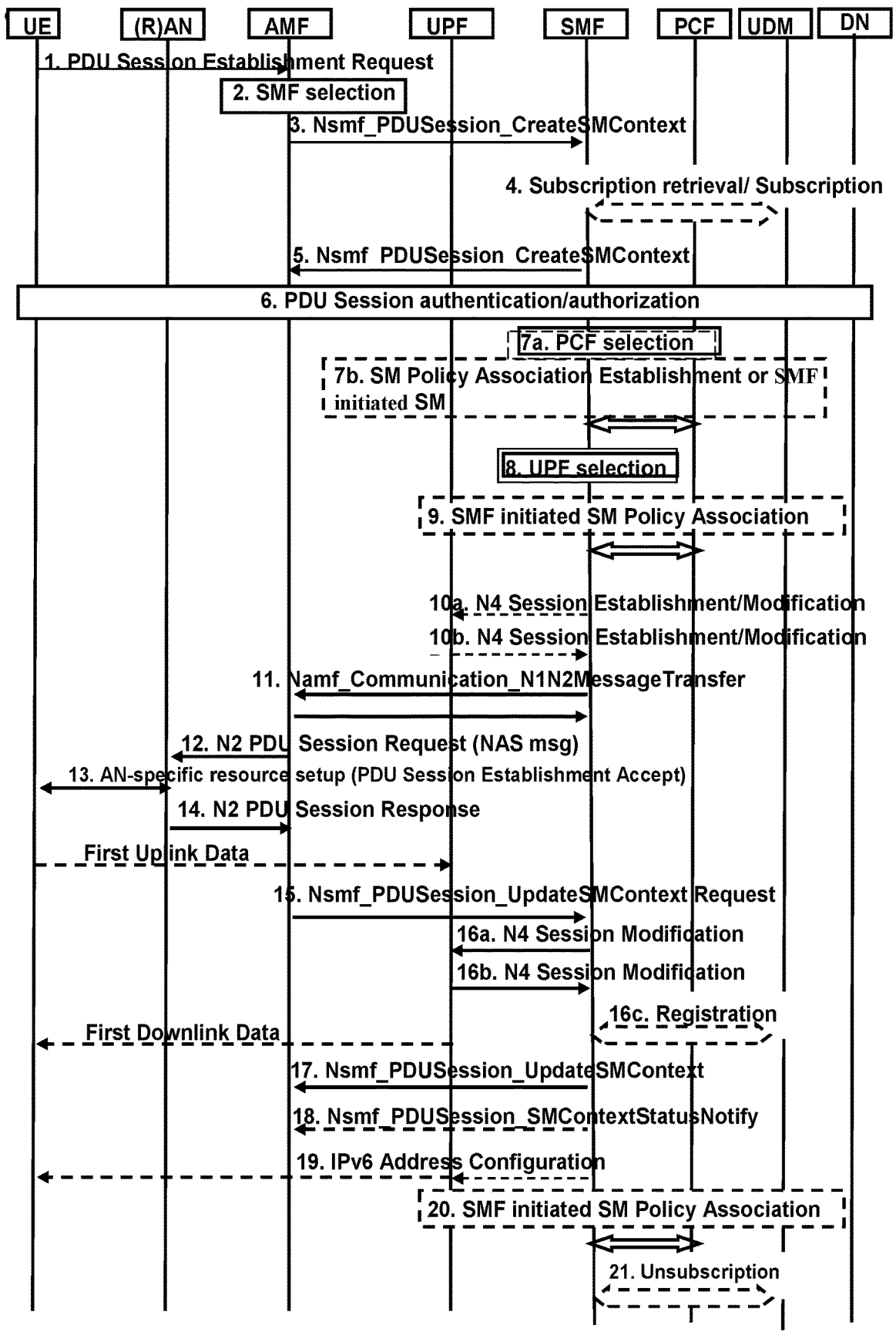
FIG. 1 illustrates an example of UE-requested PDU session establishment for non-roaming and roaming with local breakout in accordance with various embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrases "A or B" and "A/B" mean (A), (B), or (A and B).

Among other things, the following embodiments of the present disclosure are directed to incorporating RAN measurements when determining traffic distribution across 3GPP and Wi-Fi access for ATSSS. This disclosure describes details of the new steering modes required to support the RAN aware traffic distribution between the two accesses and the system enhancements required in the UE, NG-RAN, Wi-Fi Access and 5GC to support the same.

By incorporating RAN-measurements, the network can proactively adjust traffic distribution across 3GPP and Wi-Fi access according to more accurate access network performance (rate, latency, etc.) estimate. This enables more efficient use of multiple access technologies and better quality-of-service (QOS) guarantee through tight multiple access traffic management. Embodiments of this disclosure enhance the access backbone for multi-access edge computing (MEC), which is important to the success of MEC.

New Steering Modes to Support RAN Measurement Feedback-Based Traffic Distribution in ATSSS ATSSS capabilities which include Steering Functionalities and Steering Modes are negotiated between the UE and the network during Multi Access PDU session establishment (as defined in TS 23.501). A Steering Mode determines how the traffic of the matching SDF should be distributed across 3GPP and non-3GPP accesses. Three new steering modes are defined to support RAN measurement feedback-based traffic distribution in ATSSS.

Load-Balancing with RAN measurement: It is used to split an SDF across both accesses if both accesses are available. It contains the percentage of the SDF traffic that should be sent over 3GPP access and over non-3GPP access. In addition, if one access becomes unavailable, all SDF traffic is switched to the other available access, as if the percentage of the SDF traffic transported via the available access was 100%. The determination of the percentage of the SDF traffic that should be sent over 3GPP access and over non-3GPP access is done by SMF based on the NR RAN measurements received from NG-RAN, Wi-Fi RAN measurements received from WLAN AP and additional local UE RAN measurements for NR or Wi-Fi received from the UE over PMF messaging. Whenever load balancing split percentage is updated based on RAN measurements, ATSSS rule on the UE needs to be updated.

Priority-based with RAN measurement: It is used to steer all the traffic of an SDF to the high priority access, until this access is determined to be congested. In this case, the traffic of the SDF is sent also to the low priority access, e.g. the SDF traffic is split over the two accesses. In addition, when the high priority access becomes unavailable, all SDF traffic is switched to the low priority access. How UE and UPF determine when a congestion occurs on an access is based on the NR RAN measurements received from NG-RAN, Wi-Fi RAN measurements received from WLAN AP and local RAN measurements received from the UE for NR or Wi-Fi links over PMF messaging. This mode could optionally specify overall load threshold to determine congestion for a given access at the UE. ATSSS rule may need to be updated if high-priority access is changed based on RAN measurements.

Dynamic traffic steering with RAN measurement: It is used to dynamically make decision to split/switch/steer SDF traffic across both accesses based on RAN measurements from NR and Wi-Fi access and local RAN measurements received from the UE for NR or Wi-Fi links over PMF messaging. Decision on how to split/switch/steer SDF dynamically is based on implementation specific algorithms. This mode could optionally specify certain thresholds to guide decisions at the UE for dynamic traffic distribution over 3GPP and non-3GPP access. ATSSS rule does not need to be updated based on RAN measurements. This mode allows support for proprietary algorithms for dynamically scheduling traffic over two accesses on the UPF and UE, enabling performance differentiation.

UE indicates support for these steering modes in the UE ATSSS Capability provided in the PDU session establishment message when establishing the MA-PDU session. UE ATSSS Capability also indicates if UE supports receiving updates to ATSSS rules over PMF messaging.

B. PDU Session Establishment to Support RAN Measurement Feedback-Based Traffic Distribution in ATSSS Whether an operator allows RAN measurement based ATSSS is determined a. As part of PCC rules from PCF (if dynamic PCC is supported) to SMF during the MA PDU session establishment procedure.

b. Based on the UE subscription, SMF checks with the UDM if the UE subscription allows RAN measurement based ATSSS steering modes.

UE Requested MA PDU Session Establishment Request Procedure

As illustrated in FIG. 1, the signaling flow for a MA PDU Session establishment when the UE is not roaming, or when the UE is roaming and the PDU Session Anchor (PSA) is located in the VPLMN, is based on the signaling flow from TS 23.502 with the differences and clarifications as highlighted to support RAN measurement feedback-based traffic distribution in ATSSS:

The PDU Session Establishment Request message may be sent over the 3GPP access or over the non-3GPP access. In the steps below, it is assumed that it is sent over the 3GPP access, unless otherwise specified.

In step 1, the UE provides Request Type as "MA PDU Request" in UL NAS Transport message and its ATSSS Capabilities in PDU Session Establishment Request message.

The "MA PDU Request" Request Type in the UL NAS Transport message indicate to the network that this PDU Session Establishment Request is to establish a new MA PDU Session and to apply the ATSSS-LL functionality, or the MPTCP functionality, or both functionalities, for steering the traffic of this MA PDU session.

If the UE requests an S-NSSAI and the UE is registered over both accesses, it shall request an S-NSSAI that is allowed on both accesses.

In step 2, if the AMF supports MA PDU sessions, then the AMF selects an SMF, which supports MA PDU sessions.

In step 3, the AMF informs the SMF that the request is for a MA PDU Session by including "MA PDU Request" indication and, in addition, it indicates to SMF whether the UE is registered over both accesses. If the AMF determines that the UE is registered via both accesses but the requested S-NSSAI is not allowed on both accesses, then the AMF shall reject the MA PDU session establishment.

In step 4, the SMF retrieves, via Session Management subscription data, the information whether the MA PDU session is allowed or not. In addition, the SMF retrieves via Session Management subscription data, the information whether RAN measurement based steering modes are allowed or not.

In step 7, if dynamic PCC is to be used for the MA PDU Session, the SMF sends an "MA PDU Request" indication to the PCF in the SM Policy Control Create message and the ATSSS Capabilities of the MA PDU session. The SMF provides the currently used Access Type(s) and RAT Type(s) to the PCF. The PCF decides whether the MA PDU session is allowed or not based on operator policy and subscription data. The PCF decides whether RAN measurement based steering modes are allowed or not based on operator policy and subscription data.

The PCF provides PCC rules that include MA PDU session control information. From the received PCC rules, the SMF derives (a) ATSSS rules, which will be sent to UE for controlling the traffic steering, switching and splitting in the uplink direction, and (b) N4 rules, which will be sent to UPF for controlling the traffic steering, switching and splitting in the downlink direction. If the UE indicates the support of "ATSSS-LL Capability", the SMF may derive the Measurement Assistance Information.

If the SMF receives a UP Security Policy for the PDU Session with Integrity Protection set to "Required" and the MA PDU session is being established over non-3GPP access, the SMF does not verify whether the access can satisfy the UP Security Policy.

In the remaining steps of Figure, the SMF establishes the user-plane resources over the 3GPP access, e.g. over the access where the PDU Session Establishment Request was sent on:

In step 10, the N4 rules derived by SMF for the MA PDU session are sent to UPF and two N3 UL CN tunnels info are allocated by the UPF. If the ATSSS Capability for the MA PDU Session indicates "ATSSS-LL Capability", the SMF may include information for measurement into the N4 rule to instruct the UPF to initiate performance measurement for this MA PDU Session. In step 10a, the UPF allocates addressing information for the Performance Measurement Function (PMF) in the UPF. In step 10b, the UPF sends the addressing information for the PMF in the UPF to the SMF.

In step 11, for the MA PDU session, the SMF includes an "MA PDU session Accepted" indication in the Namf_Communication_N1N2MessageTransfer message to the AMF and indicates to AMF that the N2 SM Information included in this message should be sent over 3GPP access. The AMF marks this PDU session as MA PDU session based on the received "MA PDU session Accepted" indication.

The N2 SM information carries information that the AMF shall forward to the (R)AN which includes:

The CN Tunnel Info corresponds to the Core Network address(es) of the N3 tunnel corresponding to the PDU Session. If two CN Tunnel Info are included for the PDU session for redundant transmission, the SMF also indicates the NG-RAN that one of the CN Tunnel Info used as the redundancy tunnel of the PDU.

One or multiple QoS profiles and the corresponding QFIs can be provided to the (R)AN. The SMF may indicate for each QoS Flow whether redundant transmission shall be performed by a corresponding redundant transmission indicator.

The PDU Session ID may be used by AN signalling with the UE to indicate to the UE the association between (R)AN resources and a PDU Session for the UE.

A PDU Session is associated to an S-NSSAI of the HPLMN and, if applicable, to a S-NSSAI of the VPLMN, and a DNN. The S-NSSAI provided to the (R)AN, is the S-NSSAI with the value for the Serving PLMN.

User Plane Security Enforcement information is determined by the SMF.

If the User Plane Security Enforcement information indicates that Integrity Protection is "Preferred" or "Required", the SMF also includes the UE Integrity Protection Maximum Data Rate as received in the PDU Session Establishment Request.

"MA PDU session Accepted" indication used by the RAN to mark this PDU session as MA PDU session.

"RAN measurement-based steering" indication from SMF to NG-RAN indicates that RAN measurement is required for this PDU session.

In step 12, the RAN receives N2 PDU Session Request which includes N2 Session Information. If "MA PDU session Accepted" indication is sent from SMF to AMF, then the N2 Session Information may include "RAN measurement-based steering" indication.

In step 13, the UE receives a PDU Session Establishment Accept message, which indicates to UE that the requested MA PDU session was successfully established. This message includes the ATSSS rules for the MA PDU session, which were derived by SMF. If the ATSSS Capability for the MA PDU Session indicates "ATSSS-LL Capability", the SMF may include the addressing information of PMF in the UPF into the Measurement Assistance Information.

Figure 4:
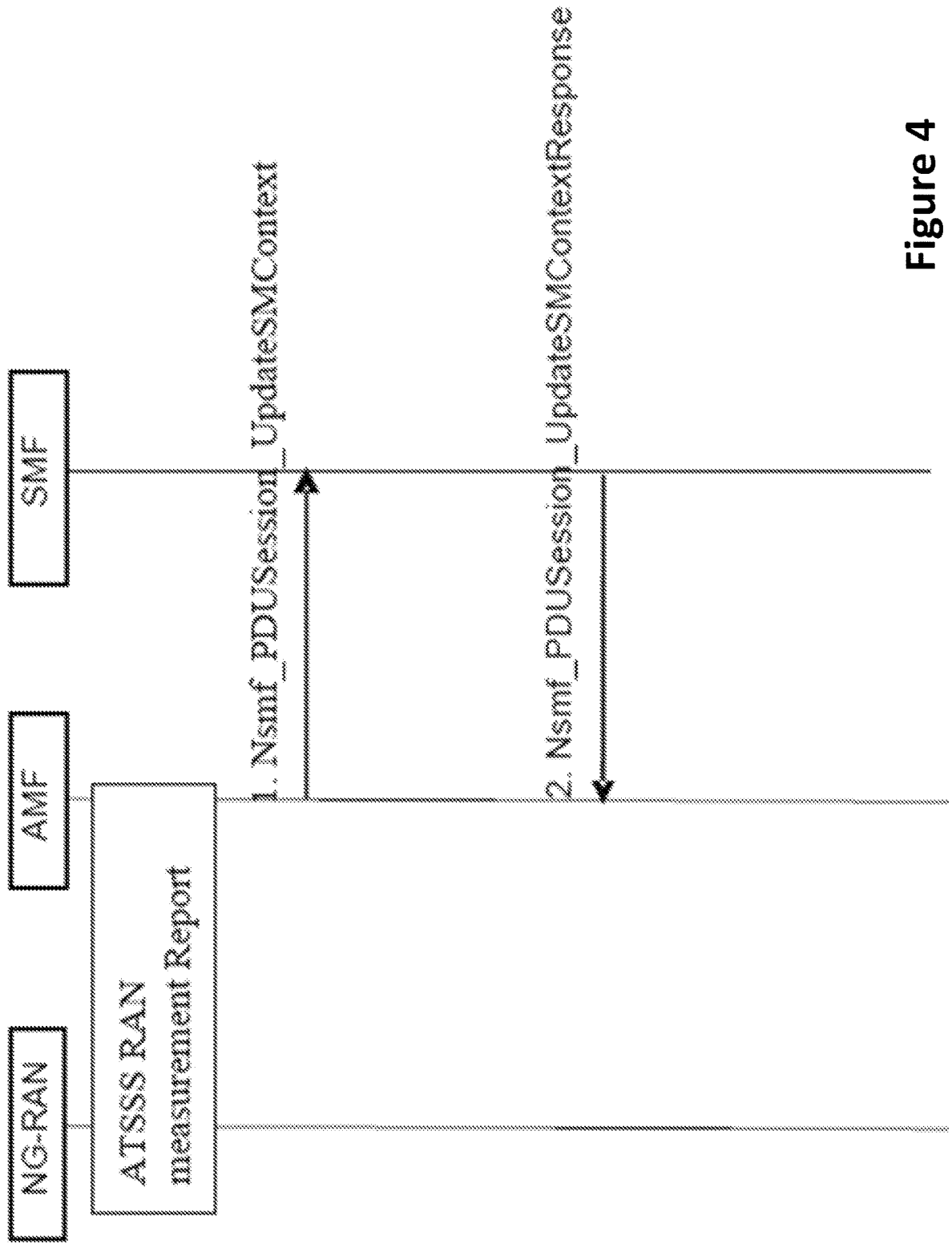
FIG. 4 illustrates an example of an SMF RAN measurement report procedure in accordance with various embodiments.

After step 18 in FIG. 4.3.2.2.1-1, if the SMF was informed in step 2 that the UE is registered over both accesses, then the SMF initiates the establishment of user-plane resources over non-3GPP access too. The SMF sends an N1N2 Message Transfer to AMF including N2 SM Information and indicates to AMF that the N2 SM Information should be sent over non-3GPP access. The N2 SM Information may include the "MA PDU session Accepted" indication used by the RAN to mark this PDU session as MA PDU session. The N2 SM Information may include the "RAN measurement-based steering" indication from SMF indicating to non-3GPP access that the RAN measurement is required for this PDU session. The N1N2 Message Transfer does not include an N1 SM Container for the UE because this was sent to UE in step 13. After this step, the two N3 tunnels between the PSA and RAN/AN are established.

The last step above is not executed when the UE is registered over one access only, in which case the MA PDU Session is established with user-plane resources over one access only. How user-plane resources can be added over an access of the MA PDU Session is specified in clause 4.22.7.

UE or Network Requested MA PDU Session Modification Request

Figure 2:
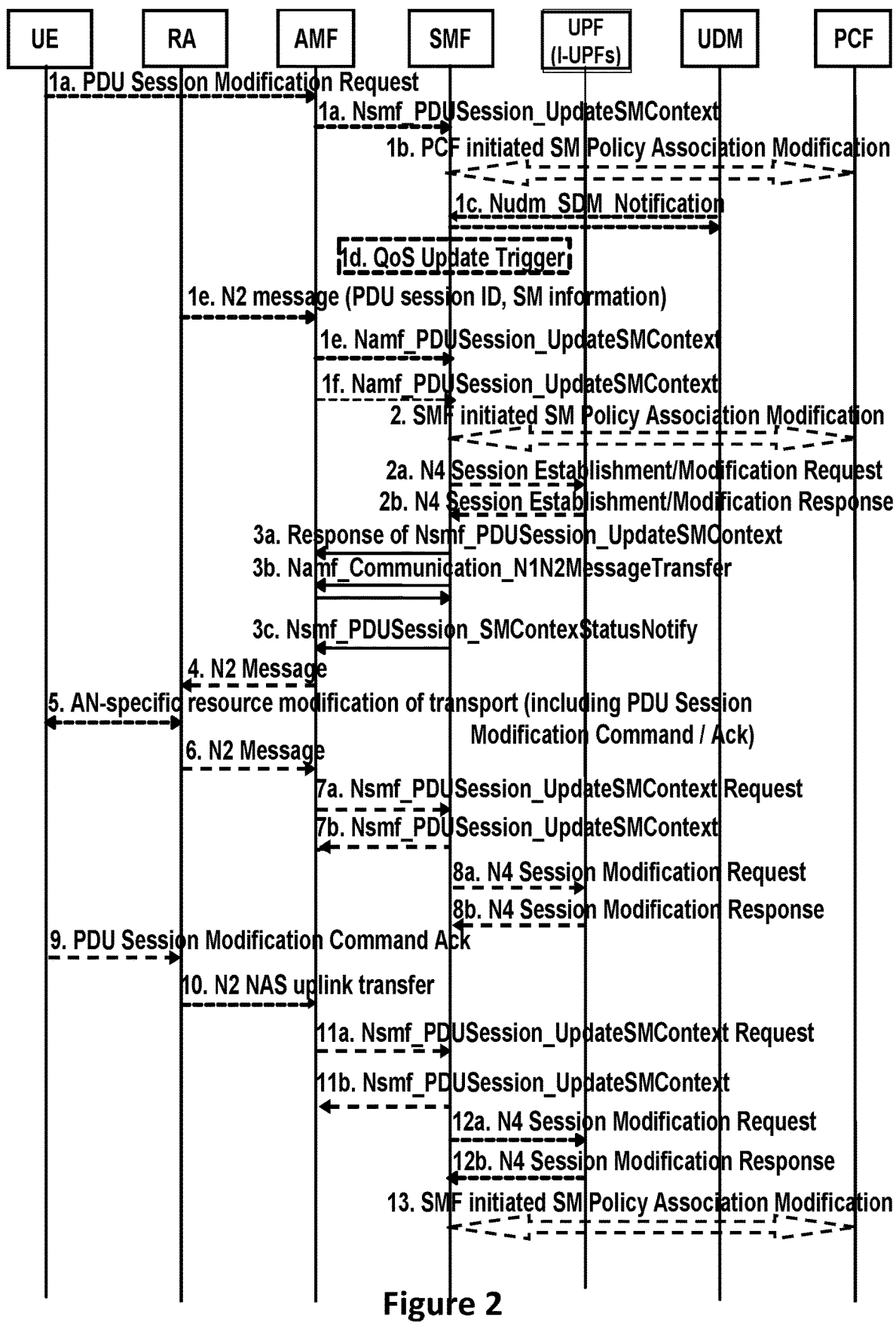
FIG. 2 illustrates an example of UE or network-requested PDU session modification (for non-roaming and roaming with local breakout) in accordance with various embodiments.

As illustrated in FIG. 2, the signalling flow for a MA PDU Session Modification when the UE is not roaming, or when the UE is roaming and the PDU Session Anchor (PSA) is located in the VPLMN, is based on the signalling flow from TS 23.502 with the differences and clarifications as highlighted to support RAN measurement feedback-based traffic distribution in ATSSS:

In step 1b, the SMF may decide to update ATSSS rules and/or N4 rules based on updated PCC rules. When RAN feedback measurement for ATSSS is allowed, the SMF may decide to update ATSSS rules and/or N4 rules based on the RAN Measurement Report received from NG-RAN or Wi-Fi RAN measurements report received from TNGF or local UE RAN measurements for NR or Wi-Fi received from the UE over PMF messaging.

In step 1d, if the UPF determines that it cannot send GBR traffic over the current ongoing access e.g. based on the N4 rules and access availability and unavailability report from the UE, the UPF shall send Access Availability report to the SMF. When the SMF receives the Access Availability report, the SMF may decide to move the GBR QOS Flow to the other access. If the SMF decides to move the GBR QOS Flow, the SMF triggers this procedure and, afterwards moves the GBR QOS Flow to the target access.

In step 3, if the SMF decides to move the GBR QOS Flow to the other access, the SMF sends N2 SM information to the target AN. The PDU Session Modification Command message is sent to the UE to update ATSSS rule of the UE so that the UE sends uplink GBR traffic over the target access. The SMF releases AN resources of the GBR QOS Flow in the source access.

In step 3, when the SMF establishes user plane resources for a QoS flows, the SMF provides QoS profile to the AN as follows:

for Non-GBR QOS Flow, steps 3 to 8 are performed over each access for which the user plane resources are activated.

for GBR QOS Flow allowed in a single access, steps 3 to 8 are performed in the allowed access.

for GBR QOS Flow allowed in both accesses, steps 3 to 8 are performed in the access according to the decision by the SMF.

In step 3, if the SMF wants to update ATSSS rules, the SMF includes updated ATSSS rules in the N1 SM container (PDU Session Modification Command). When the SMF provides N1 SM container and/or N2 SM information, the SMF includes access type in the Namf_Communication_N1N2MessageTransfer to provide routing information to the AMF.

In step 8, if the SMF decides to move GBR QOS Flow to the other access, the SMF may send updated N4 rules to the UPF.

N2 Measurement Notification Procedure

During PDU session establishment procedure if SMF determines that RAN measurement based ATSSS steering modes are allowed for the UE, the SMF sends an indication to the AN (N2 SM info) that RAN measurement-based traffic splitting is required to be supported and RAN measurements need to be reported. This indication is also sent to the gateway function TNGF for non-3GPP access indicating RAN measurements are required from non-3GPP access. The AN determines the RAN measurements to be sent to the SMF or alternatively, the 5G Core can specify what RAN measurements should be reported to NG-RAN or TNGF.

Figure 3:
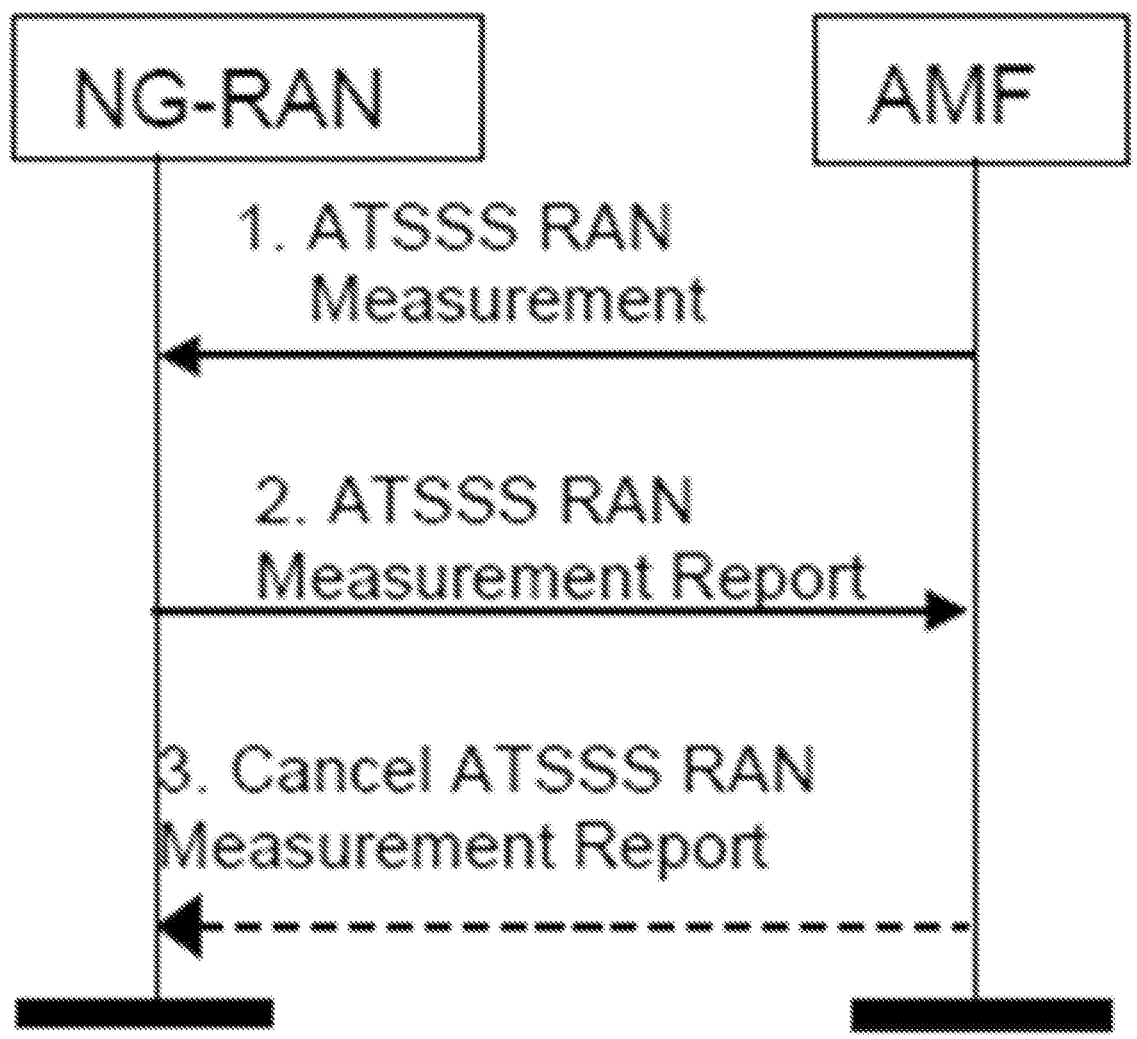
FIG. 3 illustrates an example of an N2 ATSSS RAN measurement notification procedure in accordance with various embodiments.

As illustrated in FIG. 3, an N2 Measurement Notification procedure is used by the AMF to request the NG-RAN to report RAN measurements for ATSSS. This procedure may be used for subscription to the ATSSS RAN measurement service by SMF (other NFs). Reporting of RAN measurements can be requested per UE by AMF or continuous reporting of NG-RAN measurements (per cellID basis) can be requested by AMF or enabled by operator local configuration.

1. The AMF sends an ATSSS RAN measurement Notification Request to the NG-RAN. The ATSSS RAN measurement Notification Request message shall identify the UE for which notification(s) are requested and may contain a reporting type. The reporting type either periodic reporting or it indicates on demand reporting.

2. The NG-RAN sends the ATSSS RAN measurement report message to report the RAN measurements for a UE (give example for the RAN measurement) or a cellId. The current UE location information (e.g. TAI+Cell Identity) is always included. This message can be periodically reported based on configuration.

3. The AMF can send a Cancel ATSSS RAN Measurement Report message to inform the NG-RAN that it should terminate sending RAN measurement notifications for a given UE or a cellId.

As illustrated in FIG. 4, if during PDU session establishment, RAN measurement-based steering mode is allowed based on the UE subscription or PCC rules, then the SMF shall subscribe for RAN measurement Report from the AMF to receive RAN measurements from NG-RAN or Wi-Fi RAN measurements from TNGF.

1. The AMF forwards the N2 SM Information (ATSSS RAN Measurement Data) to the SMF in a Nsmf_PDUSession_UpdateSMContext Request.

2. The SMF acknowledges receiving the ATSSS RAN Measurement data back to the AMF.

| UDM Services-UE subscription data types | | |
| --- | --- | --- |
| Subscription data type | Field | Description |
| Access and Mobility Subscription data (data needed for UE Registration and Mobility Management) | GPSI List | List of the GPSI (Generic Public Subscription Identifier) used both inside and outside of the 3GPP system to address a 3GPP subscription. |
| | Internal Group ID-list | List of the subscribed internal group(s) that the UE belongs to. |
| | Subscribed-UE-AMBR | The Maximum Aggregated uplink and downlink MBRs to be shared across all Non-GBR QOS Flows according to the subscription of the user. |
| | Subscribed S-NSSAIs | The Network Slices that the UE subscribes to. In the roaming case, it indicates the subscribed Network Slices applicable to the Serving PLMN. |
| | Default S-NSSAIs | The Subscribed S-NSSAIs marked as default S-NSSAI. In the roaming case, only those applicable to the Serving PLMN. |

-continued

| Subscription data type | UDM Services-UE subscription data types | |
|---|---|---|
| | Field | Description |
| | S-NSSAIs subject to Network Slice-Specific Authentication and Authorization | The Subscribed S-NSSAIs marked as subject to NSSAA. |
| | UE Usage Type | As defined in TS 23.501 [2], clause 5.15.7.2. |
| | RAT restriction | 3GPP Radio Access Technology(ies) not allowed the UE to access. |
| | Forbidden area | Defines areas in which the UE is not permitted to initiate any communication with the network. |
| | Service Area Restriction | Indicates Allowed areas in which the UE is permitted to initiate communication with the network, and Non-allowed areas in which the UE and the network are not allowed to initiate Service Request or SM signalling to obtain user services. |
| | Core Network type restriction | Defines whether UE is allowed to connect to 5GC and/or EPC for this PLMN. |
| | CAG information | The CAG information includes Allowed CAG list and, optionally an indication whether the UE is only allowed to access 5GS via CAG cells as defined in TS 23.501 [2], clause 5.30.3. |
| | CAG information Subscription Change Indication | When present, indicates to the serving AMF that the CAG information in the subscription data changed and the UE must be updated. |
| | RFSP Index | An index to specific RRM configuration in the NG-RAN. |
| | Subscribed Periodic Registration Timer | Indicates a subscribed Periodic Registration Timer value. |
| | MPS priority | Indicates the user is subscribed to MPS as indicated in TS 23.501 [2], clause 5.16.5. |
| | MCX priority | Indicates the user is subscribed to MCX as indicated in TS 23.501 [2], clause 5.16.6. |
| | AMF-Associated Expected UE Behaviour parameters | Information on expected UE movement and communication characteristics. See clause 4.15.6.3 |
| | AMF-Associated Network Configuration parameters | Information on UE specific network configuration parameters and their corresponding validity times. See clause 4.15.6.3a. |
| | Steering of Roaming | List of preferred PLMN/access technology combinations or HPLMN indication that no change of the "Operator Controlled PLMN Selector with Access Technology" list stored in the UE is needed (see NOTE 3). Optionally includes an indication that the UDM requests an acknowledgement of the reception of this information from the UE. |
| | SoR Update Indicator for Initial Registration | An indication whether the UDM requests the AMF to retrieve SoR information when the UE performs Registration with NAS Registration Type "Initial Registration". |
| | SOR Update Indicator for Emergency Registration | An indication whether the UDM requests the AMF to retrieve SoR information when the UE performs Registration with NAS Registration Type "Emergency Registration". |
| | Network Slicing Subscription Change | When present, indicates to the serving AMF that the subscription data |

-continued

| Subscription data type | Field | Description |
|---|---|---|
| | Indicator | for network slicing changed and the UE configuration must be updated. |
| | Tracing Requirements | Trace requirements about a UE (e.g. trace reference, address of the Trace Collection Entity, etc.) is defined in TS 32.421 [39]. This information is only sent to AMF in the HPLMN or one of its equivalent PLMN(s). |
| | Inclusion of NSSAI in RRC Connection Establishment Allowed | When present, it is used to indicate that the UE is allowed to include NSSAI in the RRC connection Establishment in clear text for 3GPP access. |
| | Service Gap Time | Used to set the Service Gap timer for Service Gap Control (see TS 23.501 [2] clause 5.31.16). |
| | Subscribed DNN list | List of the subscribed DNNs for the UE (NOTE 1). Used to determine the list of LADN available to the UE as defined in clause 5.6.5 of TS 23.501 [2]. |
| | UDM Update Data | Includes a set of parameters (e.g. updated Default Configured NSSAI and/or updated Routing Indicator) to be delivered from UDM to the UE via NAS signalling as defined in clause 4.20 (NOTE 3). Optionally includes an indication that the UDM requests an acknowledgement of the reception of this information from the UE and an indication for the UE to re-register. |
| | NB-IoT UE priority | Numerical value used by the NG-RAN to prioritise between UEs accessing via NB-IOT. |
| | Enhanced Coverage Restriction | Specifies whether CE mode B is restricted for the UE, or both CE mode A and CE mode B are restricted for the UE, or both CE mode A and CE mode B are not restricted for the UE. |
| | IAB-Operation allowed | Indicates that the subscriber is allowed for IAB-operation as specified in TS 23.501 [2] clause 5.35.2. |
| | Charging Characteristics | It contains the Charging Characteristics as defined in Annex A, clause A.1 of TS 32.256 [71]. |
| | Extended idle mode DRX cycle length | Indicates a subscribed extended idle mode DRX cycle length value. |
| Slice Selection Subscription data (data needed for Slice Selection as described in clause 4.2.2.2.3 and in clause 4.11.0a.5) | Subscribed S-NSSAIs | The Network Slices that the UE subscribes to. In roaming case, it indicates the subscribed network slices applicable to the serving PLMN. |
| | Default S-NSSAIs | The Subscribed S-NSSAIs marked as default S-NSSAI. In the roaming case, only those applicable to the Serving PLMN. |
| | S-NSSAIs subject to Network Slice-Specific Authentication and Authorization | The Subscribed S-NSSAIs marked as subject to NSSAA. |
| UE context in AMF data | AMF | Allocated AMF for the registered UE. Include AMF address and AMF NF Id. |
| | Access Type | 3GPP or non-3GPP access through this AMF |
| | Homogenous Support of IMS Voice over PS Sessions for AMF | Indicates per UE and AMF if "IMS Voice over PS Sessions" is homogeneously supported in all TAs in the serving AMF or homogeneously not supported, or, support is non-homogeneous/unknown, see clause 5.16.3.3 of TS 23.501 [2]. |
| | URRP-AMF | UE Reachability Request |

-continued

| Subscription data type | Field | Description |
|---|---|---|
| | information | Parameter indicating that UE reachability notification from AMF has been subscribed by the UDM. The information is per UE and should be kept even when the contexts related to a specific AMF is removed. |
| SMF Selection Subscription data (data needed for SMF Selection as described in clause 6.3.2 of TS 23.501 [2]) | SUPI | Key |
| | colspan=2 | SMF Selection Subscription data contains one or more S-NSSAI level subscription data: |
| | S-NSSAI | Indicates the value of the S-NSSAI. |
| | Subscribed DNN list | List of the subscribed DNNs for the UE (NOTE 1). |
| | Default DNN | The default DNN if the UE does not provide a DNN (NOTE 2). |
| | LBO Roaming Information | Indicates whether LBO roaming is allowed per DNN, or per (S-NSSAI, subscribed DNN). |
| | Interworking with EPS indication list | Indicates whether EPS interworking is supported per (S-NSSAI, subscribed DNN). |
| | Same SMF for Multiple PDU Sessions to the same DNN and S-NSSAI | Indication whether the same SMF for multiple PDU Sessions to the same DNN and S-NSSAI is required. |
| | Invoke NEF indication | When present, indicates, per S-NSSAI and per DNN, that NEF based infrequent small data transfer shall be used for the PDU Session (see NOTE 8). |
| | SMF information for static IP address/prefix | When static IP address/prefix is used, this may be used to indicate the associated SMF information per (S-NSSAI, DNN). |
| UE context in SMF Data | SUPI | Key. |
| | PDU Session Id(s) | List of PDU Session Id(s) for the UE. |
| | colspan=2 | For emergency PDU Session Id: |
| | Emergency Information | The PGW-C + SMF FQDN for emergency session used for interworking with EPC. |
| | colspan=2 | For each non-emergency PDU Session Id: |
| | DNN | DNN for the PDU Session. |
| | SMF | Allocated SMF for the PDU Session. Includes SMF IP Address and SMF NF Id. |
| | PGW-C + SMF FQDN | The S5/S8 PGW-C + SMF FQDN used for interworking with EPS (see NOTE 5). |
| SMS Management Subscription data (data needed by SMSF for SMSF Registration) | SMS parameters | Indicates SMS parameters subscribed for SMS service such as SMS teleservice, SMS barring list |
| | Trace Requirements | Trace requirements about a UE (e.g. trace reference, address of the Trace Collection Entity, etc.) is defined in TS 32.421 [39]. This information is only sent to a SMSF in HPLMN. |
| SMS Subscription data (data needed in AMF) | SMS Subscription | Indicates subscription to any SMS delivery service over NAS irrespective of access type. |
| UE Context in SMSF data | SMSF Information | Indicates SMSF allocated for the UE, including SMSF address and SMSF NF ID. |
| | Access Type | 3GPP or non-3GPP access through this SMSF |
| Session Management Subscription data (data needed for PDU Session | GPSI List | List of the GPSI (Generic Public Subscription Identifier) used both inside and outside of the 3GPP system to address a 3GPP subscription. |
| | Internal Group | List of the subscribed internal |

-continued

| Subscription data type | Field | Description |
|---|---|---|
| Establishment) | ID-list | group(s) that the UE belongs to. |
| | Trace Requirements | Trace requirements about a UE (e.g. trace reference, address of the Trace Collection Entity, etc. . . .) is defined in TS 32.421 [39]. This information is only sent to a SMF in the HPLMN or one of its equivalent PLMN(s). |
| | | Session Management Subscription data contains one or more S-NSSAI level subscription data: |
| | S-NSSAI | Indicates the value of the S-NSSAI. |
| | Subscribed DNN list | List of the subscribed DNNs for the S-NSSAI (NOTE 1). |
| | | For each DNN in S-NSSAI level subscription data: |
| | DNN | DNN for the PDU Session. |
| | Frame Routes | Set of Frame Route information. A Frame Route refers to a range of IPV4 addresses/IPv6 Prefixes to associate with a PDU Session established on this (DNN, S-NSSAI). See NOTE 4. |
| | Allowed PDU Session Types | Indicates the allowed PDU Session Types (IPv4, IPV6, IPv4v6, Ethernet, and Unstructured) for the DNN, S-NSSAI. See NOTE 6. |
| | Default PDU Session Type | Indicates the default PDU Session Type for the DNN, S-NSSAI. |
| | Allowed SSC modes | Indicates the allowed SSC modes for the DNN, S-NSSAI. |
| | Default SSC mode | Indicate the default SSC mode for the DNN, S-NSSAI. |
| | Interworking with EPS indication | Indicates whether interworking with EPS is supported for this DNN and S-NSSAI. |
| | 5GS Subscribed QoS profile | The QoS Flow level QoS parameter values (5QI and ARP) for the DNN, S-NSSAI (see clause 5.7.2.7 of TS 23.501 [2]). |
| | Charging Characteristics | It contains Charging Characteristics as defined in Annex A, clause A.1 of TS 32.255 [45]. This information, when provided, shall override any corresponding predefined information at the SMF. |
| | Subscribed-Session-AMBR | The maximum aggregated uplink and downlink MBRs to be shared across all Non-GBR QOS Flows in each PDU Session, which are established for the DNN, S-NSSAI. |
| | Static IP address/prefix | Indicate the static IP address/prefix for the DNN, S-NSSAI. |
| | User Plane Security Policy | Indicates the security policy for integrity protection and encryption for the user plane. |
| | PDU Session continuity at inter RAT mobility | Provides for this DDN, S-NSSAI how to handle a PDU Session when UE the moves to or from NB-IOT. Possible values are: maintain the PDU session; disconnect the PDU session with a reactivation request; disconnect PDU session without reactivation request; or to leave it to local VPLMN policy. |
| | NEF Identity for NIDD | When present, indicates, per S-NSSAI and per DNN, the identity of the NEF to anchor Unstructured PDU Session. When not present for the S-NSSAI and DNN, the PDU session terminates in UPF (see NOTE 8). |
| | NIDD information | Information such as External Group Identifier, External Identifier, MSISDN, or AF ID used for SMF-NEF Connection. |

| UDM Services-UE subscription data types | | |
| --- | --- | --- |
| Subscription data type | Field | Description |
| | SMF-Associated Expected UE Behaviour parameters | Parameters on expected characteristics of a PDU Session their corresponding validity times as specified in clause 4.15.6.3. |
| | SMF-Associated Network Configuration parameters | Parameters on expected PDU session characteristics their corresponding validity times as specified in clause 4.15.6.3a. |
| | ATSSS information | Indicates whether MA PDU session establishment is allowed. |
| | RAN measurement for ATSSS | Indicates whether RAN measurement feedback for ATSSS is allowed. |
| | Secondary authentication indication | Indicates that whether the Secondary authentication/authorization is required for PDU Session Establishment as specified in clause 4.3.2.3. |
| Identifier translation | SUPI | Corresponding SUPI for input GPSI. |
| | (Optional) MSISDN | Corresponding GPSI (MSISDN) for input GPSI (External Identifier). This is optionally provided for legacy SMS infrastructure not supporting MSISDN-less SMS. The presence of an MSISDN should be interpreted as an indication to the NEF that MSISDN shall be used to identify the UE when sending the SMS to the SMS-SC via T4. |
| | GPSI | Corresponding GPSI for input SUPI and Application Port ID. |
| Intersystem continuity Context | (DNN, PGW FQDN) list | For each DNN, indicates the PGW-C + SMF which support interworking with EPC. |
| LCS privacy (data needed by GMLC) | LCS privacy profile data | Provides information for LCS privacy classes and Location Provacy Indication (LPI) as defined in clause 5.4.2 in TS 23.273 [51] |
| LCS mobile origination (data needed by AMF) | LCS Mobile Originated Data | When present, indicates to the serving AMF which LCS mobile originated services are subscribed as defined in clause 7.1 in TS 23.273 [51]. |
| UE reachability | UE reachability information | Provides, per PLMN, the list of NF IDs or the list of NF sets or the list of NF types authorized to request notification for UE's reachability (NOTE 7). |
| Steering of Roaming information | Steering of Roaming | List of preferred PLMN/access technology combinations or HPLMN indication that no change of the "Operator Controlled PLMN Selector with Access Technology" list stored in the UE is needed (see NOTE 3). Optionally, it includes an indication that the UDM requests an acknowledgement of the reception of this information from the UE. |

In one embodiment, the UE session management subscription data includes one indicator, e.g., RAN measurement for ATSSS to indicate if RAN measurement based ATSSS steering modes are allowed or not.

In another embodiment, the UE session management subscription data includes separate indicators for Load balancing with RAN measurement, Priority based with RAN measurement, Dynamic traffic steering with RAN measurement to indicate whether RAN measurement for ATSSS is allowed for each of these steering modes.

PMF Based RAN Measurement Reporting and ATSSS Rule Update

Among other things, embodiments of the present disclosure are directed to incorporating RAN measurements when determining traffic distribution across 3GPP and non-3GPP access for ATSSS. Some embodiments are directed to PMF (Performance Measurement Function) enhancements required to support the RAN aware traffic distribution between the two accesses (3GPP and Wi-Fi) based on RAN measurement feedback.

By incorporating RAN-measurements, the network can proactively adjust traffic distribution across 3GPP and Wi-Fi access according to more accurate access performance (rate, latency, etc.) estimate. This enables more efficient use of multiple access technologies and better quality-of-service (QOS) guarantee through tight multiple access traffic management, and helps to enhance the access backbone for Multi-access edge computing (MEC).

UE Measurement Report to UPF

Note: This procedure applies to reporting of UE RAN measurements for both NR and WLAN access.

Figure 5:
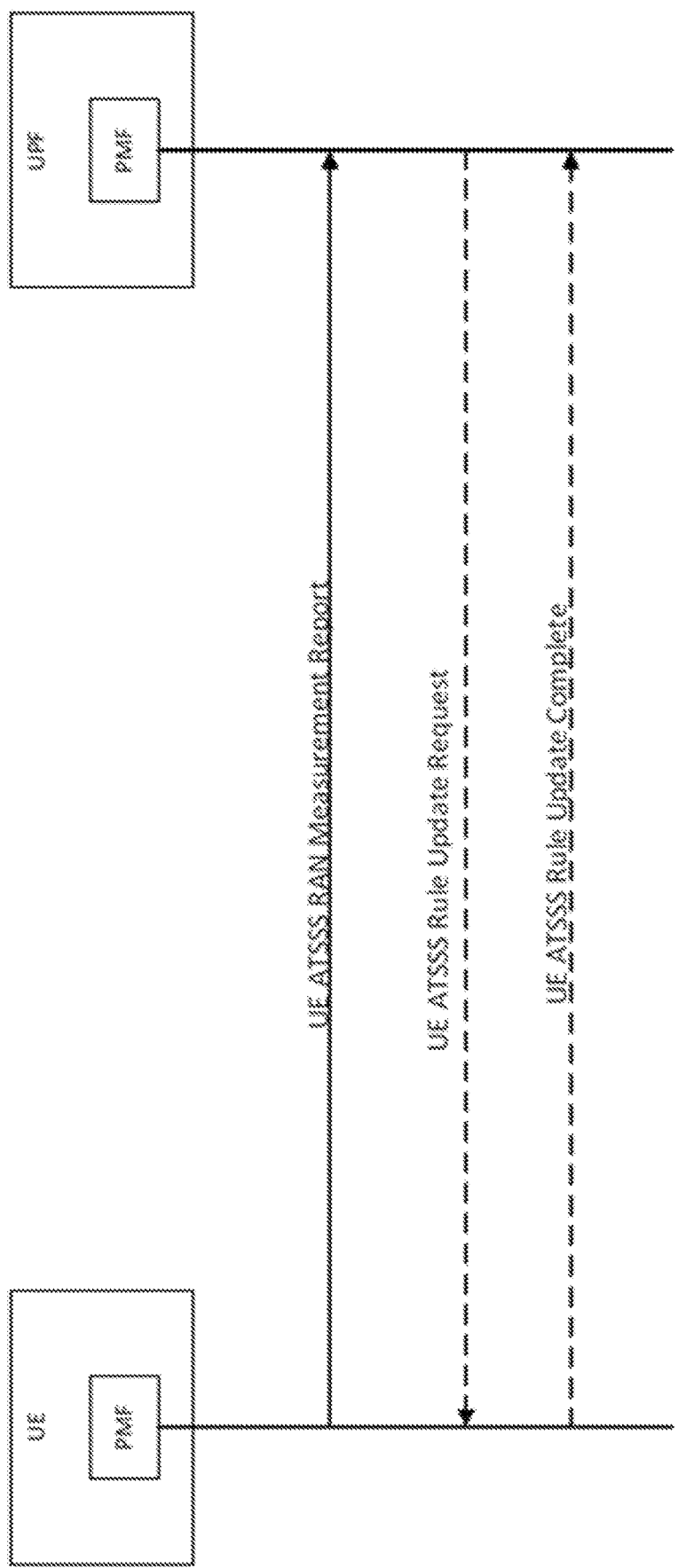
FIG. 5 illustrates an example of PMF messages between a UE and UPF for UE RAN measurements and ATSSS rules update in accordance with various embodiments.

As illustrated in FIG. 5, when an MA PDU Session is established, the network may provide the UE with Measurement Assistance Information. This information assists the UE in determining which measurements shall be performed over both accesses, as well as whether measurement reports need to be sent to the network. If the UE is capable of supporting RAN measurement feedback based steering modes, the network may send Measurement Assistance Information for the UE to send UE ATSSS RAN Measurement Report to the UPF. This report can include UE RAN measurement elements for both NR and WLAN access based on what was requested in the Measurement Assistance Information.

The following PMF protocol messages (illustrated in FIG. 5) can be exchanged between the UE and the PMF:

Messages for UE ATSSS RAN Measurement Report by the UE to the UPF.

Messages for updating UE ATSSS rules from UPF to UE

The UE ATSSS RAN Measurement Report may be sent periodically from the UE to UPF based on request made in the Measurement Assistance Information or the UPF may request the UE ATSSS RAN Measurement report on demand from the UE. In some embodiment, the UE ATSSS RAN Measurement Report is sent from UPF to the SMF based on which the SMF can decide if the ATSSS rules in the UE or the N4 rules in the UPF needs to be updated.

NG-RAN Measurement Report to UPF and ATSSS Rule Update

Figure 6:
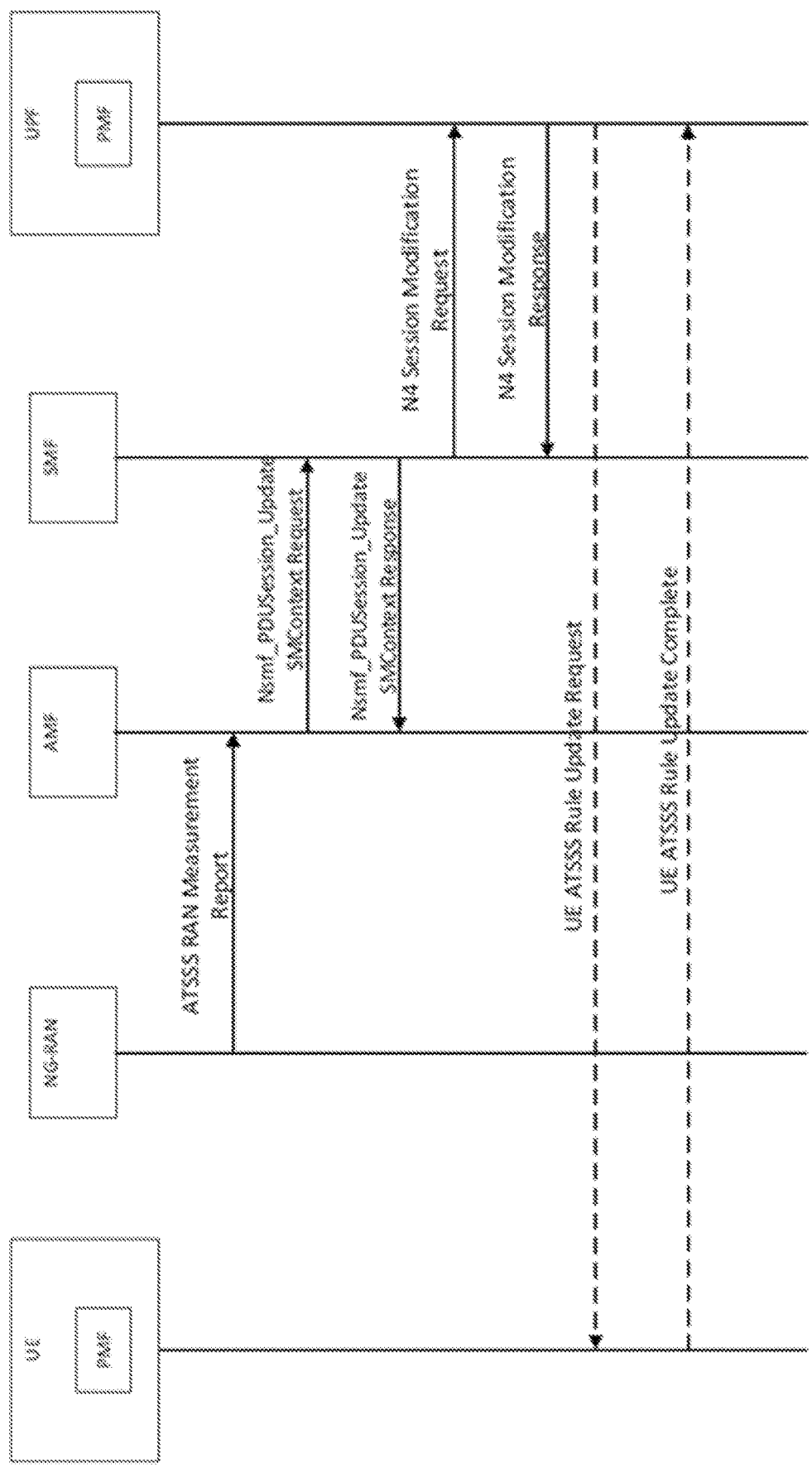
FIG. 6 illustrates an example of an ATSSS measurement report procedure in accordance with various embodiments.

As illustrated in FIG. 6, the AMF sends a request to NG-RAN to report Measurement from NG-RAN. When the AMF receives the ATSSS RAN Measurement Report from the NG-RAN, the AMF forwards the ATSSS RAN Measurement Data to the SMF. The SMF based on the ATSSS RAN Measurement Data received from NG-RAN decides if the N4 rules or ATSSS rules need to be updated. The SMF sends a N4 Session Modification Request to the UPF to update the N4 rules and/or ATSSS rules (For example, to update the ratio of load balancing or change to priority based steering between 3gpp and non-3gpp access). If the ATSSS rules update in the UE is required and if the UE supports capability to receive ATSSS rules update over PMF messaging, the PMF in the UPF sends UE ATSSS Rule Update Request to the UE. The UE sends back a UE ATSSS Rule Update Complete response message to the UPF after it updates the ATSSS rules locally.

RAN Measurements Based ATSSS for Trusted WLAN Access

Among other things, embodiments of the present disclosure are directed to incorporating RAN measurements when determining traffic distribution across 3GPP and non-3GPP access for ATSSS. Some embodiments are directed to WLAN enhancements required to support the RAN-aware traffic distribution between the two accesses based on RAN measurement feedback.

By incorporating RAN-measurements, the network can proactively adjust traffic distribution across 3GPP and Wi-Fi access according to more accurate access performance (rate, latency, etc.) estimate. This enables more efficient use of multiple access technologies and better quality-of-service (QOS) guarantee through tight multiple access traffic management. Embodiments of the present disclosure help enhance the access backbone for Multi-access edge computing (MEC).

In some embodiments, to support RAN measurements feedback based steering modes for trusted WLAN access, the following system enhancements are proposed:

1. If the RAN measurements based ATSSS steering modes are supported, the AMF requests WLAN RAN measurements for ATSSS from the TNGF over N2 messaging (similar to N2 messaging NG-RAN measurements).
2. The TNGF requests the WLAN RAN measurements from a TNAP (WLAN AP) over an existing AAA interface (Ta) using a EAP-Request/Response. In some embodiments, the EAP-5G protocol is extended with new messages to request and report WLAN RAN measurements for ATSSS.
3. The WLAN AP sends WLAN RAN measurements to the TNGF.
4. Once the TNGF receives the WLAN RAN measurements, it sends the WLAN RAN measurements report to AMF over N2 messaging (similar to N2 messaging NG-RAN measurements).
5. The AMF forwards the WLAN RAN measurements report to the SMF.
6. The SMF follows the same procedure as upon receiving ATSSS RAN measurements from NG-RAN. It may decide to update ATSSS rules and N4 rules based on WLAN RAN measurements. The SMF sends updated N4 rules to the UPF. Updates of ATSSS rules can be achieved in two ways:
   a. The SMF updates ATSSS rules through PDU Session modification.
   b. The SMF sends ATSSS rules to UPF and ATSSS rules are updated on the UE through in-band rules update via PMF messaging.

WLAN Measurement Report to UPF for Trusted WLAN Access

Figure 7:
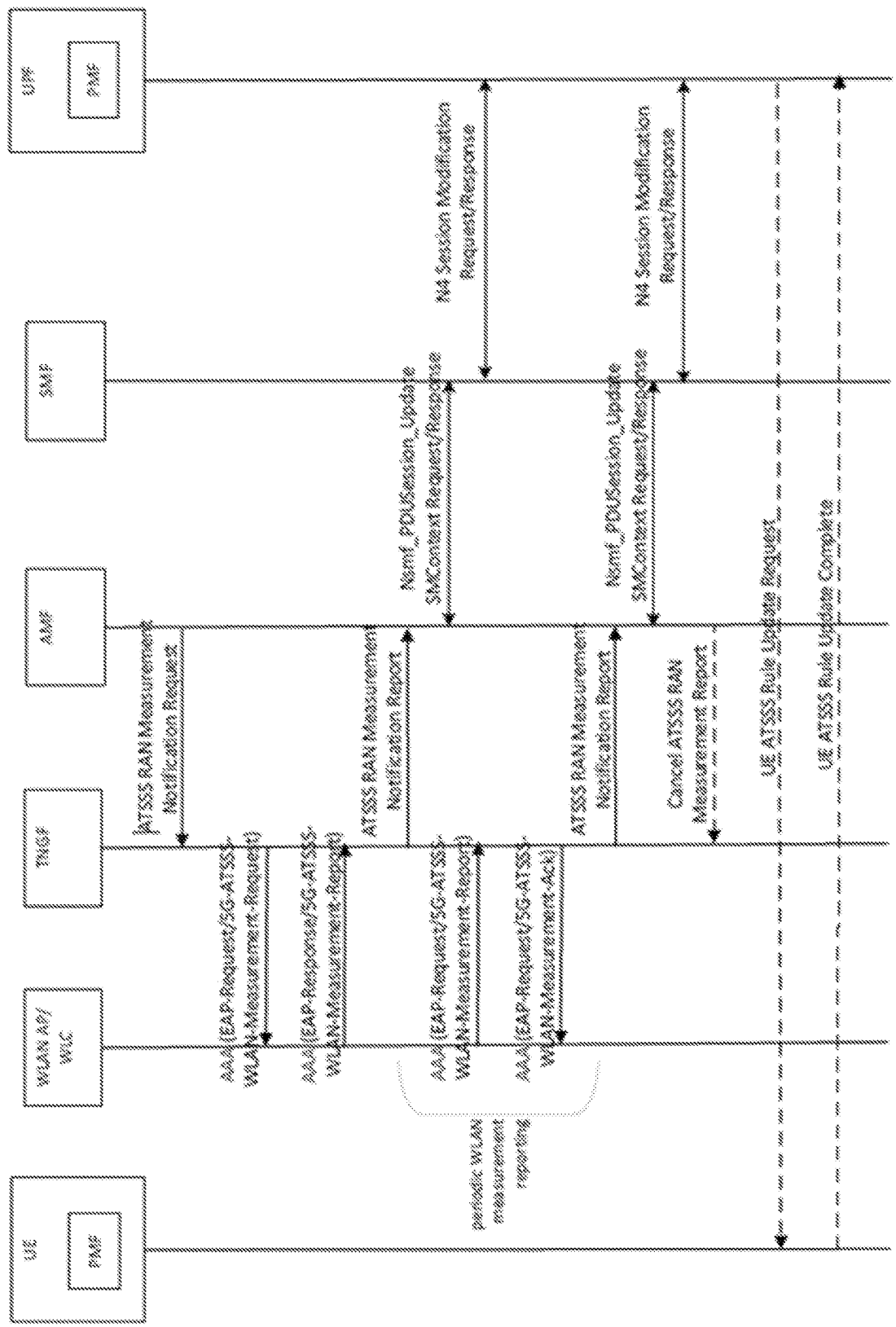
FIG. 7 illustrates an example of a WLAN RAN measurement report for ATSSS from a WLAN AP in accordance with various embodiments.

As illustrated in FIG. 7, the AMF sends an ATSSS RAN Measurement Notification request (over N2) to TNGF to request WLAN Measurement, similar to request sent to NG-RAN. This message can request WLAN measurements per AP basis and/or per STA basis. This triggers TNGF to send an EAP-Request with a new EAP-5G message (5G-ATSSS-WLAN-RAN-Measurements-Request) to the TNAP (WLAN AP). This message may specify reporting type for WLAN measurements (e.g. on-demand vs periodic) and optionally WLAN measurements elements which should be reported. The WLAN AP sends an EAP-Response with a new EAP-5G message (5G-ATSSS-WLAN-RAN-Measurements-Report) providing WLAN measurements report to the TNGF. TNGF sends the WLAN measurements report to the AMF over N2. When the AMF receives the ATSSS RAN Measurement Report from the TNGF, the AMF forwards the ATSSS RAN Measurement data to the SMF.

The SMF based on the ATSSS RAN Measurement Data received from TNGF decides if the N4 rules or ATSSS rules need to be updated. The SMF sends a N4 Session Modification Request to the UPF to update the N4 rules. If the ATSSS rules update in UE is required, the SMF may send the ATSSS rules to UPF which sends the updated ATSSS rules to UE via PMF messaging (UE ATSSS Rule Update Request/Complete). Alternatively, the SMF may trigger PDU Session modification to send updated ATSSS rules to UE.

Figure 8:
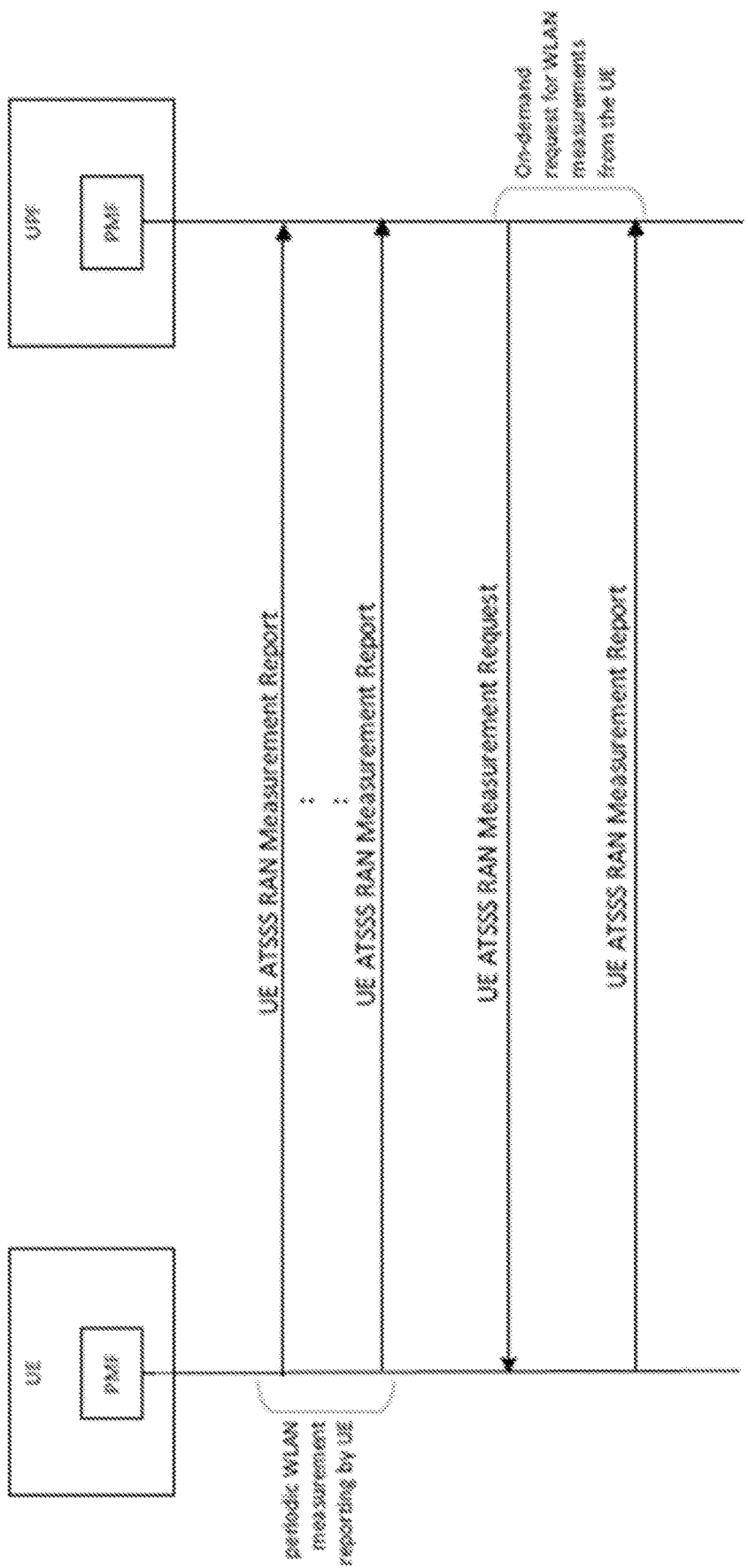
FIG. 8 illustrates an example of a UE WLAN RAN measurement report for ATSSS in accordance with various embodiments.

As illustrated in FIG. 8, for trusted WLAN access, the WLAN measurements can also be reported by the UE based on UE local RAN measurements sent over the in-band PMF messaging. UE sends UE ATSSS RAN Measurement Report to the UPF to provide UE local WLAN RAN measurements. This report can be sent periodically by the UE to the UPF based on request made in the Measurement Assistance Information. This report can also be requested on-demand by the UPF by sending a UE ATSSS RAN Measurement Request message to the UE.

Extension to EAP-5G Protocol for WLAN Measurements for Trusted WLAN Access

The EAP-5G protocol is defined in clause 9.3.2 of TS 24.502, v. 16.3.0, 2020 Mar. 27. To support reporting of WLAN measurements from trusted WLAN access for ATSSS, the following new EAP-5G messages are defined for some embodiments of the present disclosure to carry RAN measurements over AAA interface using EAP-message attribute in RADIUS (RFC 3579).

- EAP-Request/5G-ATSSS-WLAN-RAN-Measurements-Request (TNGF→TNAP): Request WLAN RAN measurements from WLAN AP. This message may specify reporting type for WLAN measurements (e.g. on-demand vs periodic) and optionally WLAN measurements elements which should be reported.
- EAP-Response/5G-ATSSS-WLAN-RAN-Measurements-Report (TNAP→TNGF): Report WLAN RAN measurements from WLAN AP to TNGF in response to a request.
- EAP-Request/5G-ATSSS-WLAN-RAN-Measurements-Report (TNAP→TNGF)—Report WLAN RAN measurements from WLAN AP to TNGF as part of periodic reporting.
- EAP-Response/5G-ATSSS-WLAN-RAN-Measurements-Report-Ack (TNGF→TNAP)—Acknowledge receipt of WLAN measurements report from WLAN AP.

RAN Measurements Based ATSSS for Untrusted WLAN Access

In case of untrusted WLAN integration, there is loose integration between N3IWF and WLAN Access over generic IP connectivity. No direct interface exists between N3IWF and WLAN AP to retrieve WLAN RAN measurements. For such deployments with untrusted WLAN access, RAN measurements from WLAN access can only be received from the UE where the UE RAN measurements are sent from UE to UPF over the in-band PMF messaging. UE sends UE ATSSS RAN Measurement Report to the UPF to provide UE local WLAN RAN measurements. This report can be sent periodically by the UE based on request made in the Measurement Assistance Information or requested on-demand by the UPF.

Systems and Implementations

Figure 9:
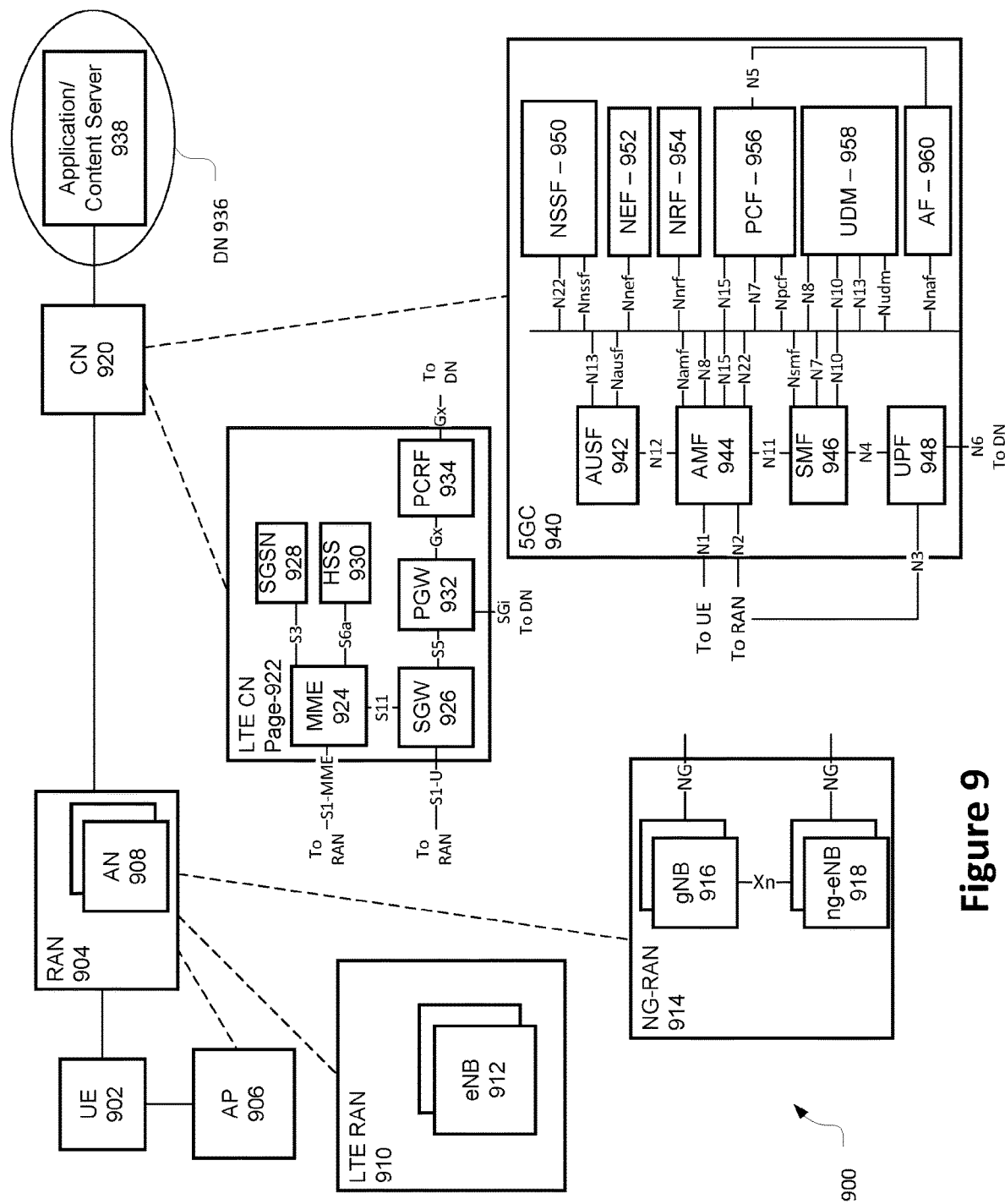
FIG. 9 illustrates a network in accordance with various embodiments.
Figure 10:
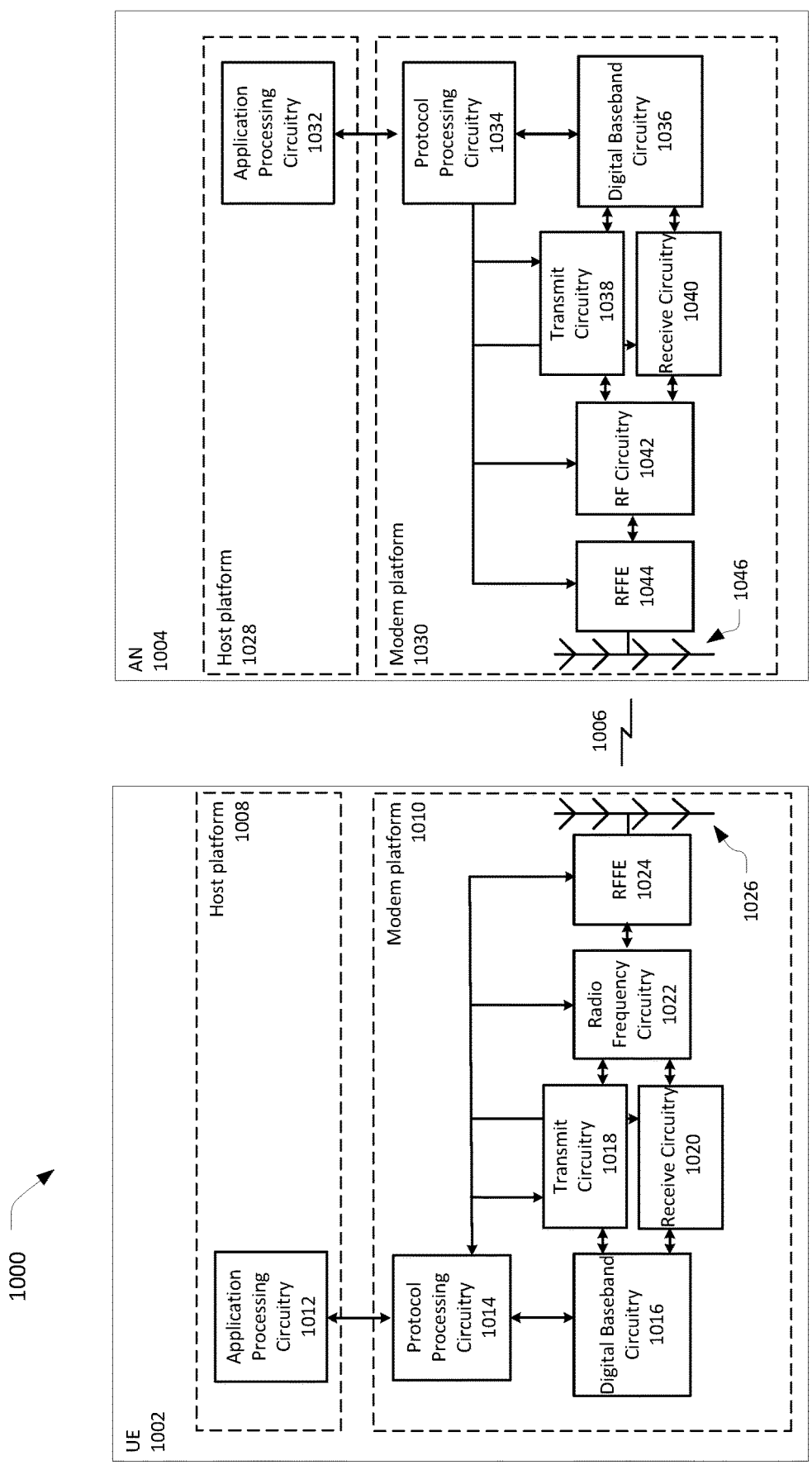
FIG. 10 illustrates a wireless network in accordance with various embodiments.

FIGS. 9-10 illustrate various systems, devices, and components that may implement aspects of disclosed embodiments.

FIG. 9 illustrates a network 900 in accordance with various embodiments. The network 900 may operate in a manner consistent with 3GPP technical specifications for LTE or 5G/NR systems. However, the example embodiments are not limited in this regard and the described embodiments may apply to other networks that benefit from the principles described herein, such as future 3GPP systems, or the like.

The network 900 may include a UE 902, which may include any mobile or non-mobile computing device designed to communicate with a RAN 904 via an over-the-air connection. The UE 902 may be communicatively coupled with the RAN 904 by a Uu interface. The UE 902 may be, but is not limited to, a smartphone, tablet computer, wearable computer device, desktop computer, laptop computer, in-vehicle infotainment, in-car entertainment device, instrument cluster, head-up display device, onboard diagnostic device, dashtop mobile equipment, mobile data terminal, electronic engine management system, electronic/engine control unit, electronic/engine control module, embedded system, sensor, microcontroller, control module, engine management system, networked appliance, machine-type communication device, M2M or D2D device, IoT device, etc.

In some embodiments, the network 900 may include a plurality of UEs coupled directly with one another via a sidelink interface. The UEs may be M2M/D2D devices that communicate using physical sidelink channels such as, but not limited to, PSBCH, PSDCH, PSSCH, PSCCH, PSFCH, etc.

In some embodiments, the UE 902 may additionally communicate with an AP 906 via an over-the-air connection. The AP 906 may manage a WLAN connection, which may serve to offload some/all network traffic from the RAN 904. The connection between the UE 902 and the AP 906 may be consistent with any IEEE 802.11 protocol, wherein the AP 906 could be a wireless fidelity (Wi-Fi®) router. In some embodiments, the UE 902, RAN 904, and AP 906 may utilize cellular-WLAN aggregation (for example, LWA/LWIP). Cellular-WLAN aggregation may involve the UE 902 being configured by the RAN 904 to utilize both cellular radio resources and WLAN resources.

The RAN 904 may include one or more access nodes, for example, AN 908. AN 908 may terminate air-interface protocols for the UE 902 by providing access stratum protocols including RRC, PDCP, RLC, MAC, and L1 protocols. In this manner, the AN 908 may enable data/voice connectivity between CN 920 and the UE 902. In some embodiments, the AN 908 may be implemented in a discrete device or as one or more software entities running on server computers as part of, for example, a virtual network, which may be referred to as a CRAN or virtual baseband unit pool. The AN 908 be referred to as a BS, gNB, RAN node, eNB, ng-eNB, NodeB, RSU, TRxP, TRP, etc. The AN 908 may be a macrocell base station or a low power base station for providing femtocells, picocells or other like cells having smaller coverage areas, smaller user capacity, or higher bandwidth compared to macrocells.

In embodiments in which the RAN 904 includes a plurality of ANs, they may be coupled with one another via an X2 interface (if the RAN 904 is an LTE RAN) or an Xn interface (if the RAN 904 is a 5G RAN). The X2/Xn interfaces, which may be separated into control/user plane interfaces in some embodiments, may allow the ANs to communicate information related to handovers, data/context transfers, mobility, load management, interference coordination, etc.

The ANs of the RAN 904 may each manage one or more cells, cell groups, component carriers, etc. to provide the UE 902 with an air interface for network access. The UE 902 may be simultaneously connected with a plurality of cells provided by the same or different ANs of the RAN 904. For example, the UE 902 and RAN 904 may use carrier aggregation to allow the UE 902 to connect with a plurality of component carriers, each corresponding to a Pcell or Scell. In dual connectivity scenarios, a first AN may be a master node that provides an MCG and a second AN may be secondary node that provides an SCG. The first/second ANs may be any combination of eNB, gNB, ng-eNB, etc.

The RAN 904 may provide the air interface over a licensed spectrum or an unlicensed spectrum. To operate in the unlicensed spectrum, the nodes may use LAA, eLAA, and/or feLAA mechanisms based on CA technology with PCells/Scells. Prior to accessing the unlicensed spectrum, the nodes may perform medium/carrier-sensing operations based on, for example, a listen-before-talk (LBT) protocol.

In V2X scenarios the UE 902 or AN 908 may be or act as a RSU, which may refer to any transportation infrastructure entity used for V2X communications. An RSU may be implemented in or by a suitable AN or a stationary (or relatively stationary) UE. An RSU implemented in or by: a UE may be referred to as a "UE-type RSU"; an eNB may be referred to as an "eNB-type RSU"; a gNB may be referred to as a "gNB-type RSU"; and the like. In one example, an RSU is a computing device coupled with radio frequency circuitry located on a roadside that provides connectivity support to passing vehicle UEs. The RSU may also include internal data storage circuitry to store intersection map geometry, traffic statistics, media, as well as applications/software to sense and control ongoing vehicular and pedestrian traffic. The RSU may provide very low latency communications required for high speed events, such as crash avoidance, traffic warnings, and the like. Additionally or alternatively, the RSU may provide other cellular/WLAN communications services. The components of the RSU may be packaged in a weatherproof enclosure suitable for outdoor installation, and may include a network interface controller to provide a wired connection (e.g., Ethernet) to a traffic signal controller or a backhaul network.

In some embodiments, the RAN 904 may be an LTE RAN 910 with eNBs, for example, eNB 912. The LTE RAN 910 may provide an LTE air interface with the following characteristics: SCS of 15 kHz; CP-OFDM waveform for DL and SC-FDMA waveform for UL; turbo codes for data and TBCC for control; etc. The LTE air interface may rely on CSI-RS for CSI acquisition and beam management; PDSCH/PDCCH DMRS for PDSCH/PDCCH demodulation; and CRS for cell search and initial acquisition, channel quality measurements, and channel estimation for coherent demodulation/detection at the UE. The LTE air interface may operating on sub-6 GHz bands.

In some embodiments, the RAN 904 may be an NG-RAN 914 with gNBs, for example, gNB 916, or ng-eNBs, for example, ng-eNB 918. The gNB 916 may connect with 5G-enabled UEs using a 5G NR interface. The gNB 916 may connect with a 5G core through an NG interface, which may include an N2 interface or an N3 interface. The ng-eNB 918 may also connect with the 5G core through an NG interface, but may connect with a UE via an LTE air interface. The gNB 916 and the ng-eNB 918 may connect with each other over an Xn interface.

In some embodiments, the NG interface may be split into two parts, an NG user plane (NG-U) interface, which carries traffic data between the nodes of the NG-RAN 914 and a UPF 948 (e.g., N3 interface), and an NG control plane (NG-C) interface, which is a signaling interface between the nodes of the NG-RAN 914 and an AMF 944 (e.g., N2 interface).

The NG-RAN 914 may provide a 5G-NR air interface with the following characteristics: variable SCS; CP-OFDM for DL, CP-OFDM and DFT-s-OFDM for UL; polar, repetition, simplex, and Reed-Muller codes for control and LDPC for data. The 5G-NR air interface may rely on CSI-RS, PDSCH/PDCCH DMRS similar to the LTE air interface. The 5G-NR air interface may not use a CRS, but may use PBCH DMRS for PBCH demodulation; PTRS for phase tracking for PDSCH; and tracking reference signal for time tracking. The 5G-NR air interface may operating on FR1 bands that include sub-6 GHz bands or FR2 bands that include bands from 24.25 GHz to 52.6 GHZ. The 5G-NR air interface may include an SSB that is an area of a downlink resource grid that includes PSS/SSS/PBCH.

In some embodiments, the 5G-NR air interface may utilize BWPs for various purposes. For example, BWP can be used for dynamic adaptation of the SCS. For example, the UE 902 can be configured with multiple BWPs where each BWP configuration has a different SCS. When a BWP change is indicated to the UE 902, the SCS of the transmission is changed as well. Another use case example of BWP is related to power saving. In particular, multiple BWPs can be configured for the UE 902 with different amount of frequency resources (for example, PRBs) to support data transmission under different traffic loading scenarios. A BWP containing a smaller number of PRBs can be used for data transmission with small traffic load while allowing power saving at the UE 902 and in some cases at the gNB 916. A BWP containing a larger number of PRBs can be used for scenarios with higher traffic load.

The RAN 904 is communicatively coupled to CN 920 that includes network elements to provide various functions to support data and telecommunications services to customers/subscribers (for example, users of UE 902). The components of the CN 920 may be implemented in one physical node or separate physical nodes. In some embodiments, NFV may be utilized to virtualize any or all of the functions provided by the network elements of the CN 920 onto physical compute/storage resources in servers, switches, etc. A logical instantiation of the CN 920 may be referred to as a network slice, and a logical instantiation of a portion of the CN 920 may be referred to as a network sub-slice.

In some embodiments, the CN 920 may be an LTE CN 922, which may also be referred to as an EPC. The LTE CN 922 may include MME 924, SGW 926, SGSN 928, HSS 930, PGW 932, and PCRF 934 coupled with one another over interfaces (or "reference points") as shown. Functions of the elements of the LTE CN 922 may be briefly introduced as follows.

The MME 924 may implement mobility management functions to track a current location of the UE 902 to facilitate paging, bearer activation/deactivation, handovers, gateway selection, authentication, etc.

The SGW 926 may terminate an S1 interface toward the RAN and route data packets between the RAN and the LTE CN 922. The SGW 926 may be a local mobility anchor point for inter-RAN node handovers and also may provide an anchor for inter-3GPP mobility. Other responsibilities may include lawful intercept, charging, and some policy enforcement.

The SGSN 928 may track a location of the UE 902 and perform security functions and access control. In addition, the SGSN 928 may perform inter-EPC node signaling for mobility between different RAT networks; PDN and S-GW selection as specified by MME 924; MME selection for handovers; etc. The S3 reference point between the MME 924 and the SGSN 928 may enable user and bearer information exchange for inter-3GPP access network mobility in idle/active states.

The HSS 930 may include a database for network users, including subscription-related information to support the network entities' handling of communication sessions. The HSS 930 can provide support for routing/roaming, authentication, authorization, naming/addressing resolution, location dependencies, etc. An S6a reference point between the HSS 930 and the MME 924 may enable transfer of subscription and authentication data for authenticating/authorizing user access to the LTE CN 920.

The PGW 932 may terminate an SGi interface toward a data network (DN) 936 that may include an application/content server 938. The PGW 932 may route data packets between the LTE CN 922 and the data network 936. The PGW 932 may be coupled with the SGW 926 by an S5 reference point to facilitate user plane tunneling and tunnel management. The PGW 932 may further include a node for policy enforcement and charging data collection (for example, PCEF). Additionally, the SGi reference point between the PGW 932 and the data network 9 36 may be an operator external public, a private PDN, or an intra-operator packet data network, for example, for provision of IMS services. The PGW 932 may be coupled with a PCRF 934 via a Gx reference point.

The PCRF 934 is the policy and charging control element of the LTE CN 922. The PCRF 934 may be communicatively coupled to the app/content server 938 to determine appropriate QoS and charging parameters for service flows. The PCRF 932 may provision associated rules into a PCEF (via Gx reference point) with appropriate TFT and QCI.

In some embodiments, the CN 920 may be a 5GC 940. The 5GC 940 may include an AUSF 942, AMF 944, SMF 946, UPF 948, NSSF 950, NEF 952, NRF 954, PCF 956, UDM 958, and AF 960 coupled with one another over interfaces (or "reference points") as shown. Functions of the elements of the 5GC 940 may be briefly introduced as follows.

The AUSF 942 may store data for authentication of UE 902 and handle authentication-related functionality. The AUSF 942 may facilitate a common authentication framework for various access types. In addition to communicating with other elements of the 5GC 940 over reference points as shown, the AUSF 942 may exhibit an Nausf service-based interface.

The AMF 944 may allow other functions of the 5GC 940 to communicate with the UE 902 and the RAN 904 and to subscribe to notifications about mobility events with respect to the UE 902. The AMF 944 may be responsible for registration management (for example, for registering UE 902), connection management, reachability management, mobility management, lawful interception of AMF-related events, and access authentication and authorization. The AMF 944 may provide transport for SM messages between the UE 902 and the SMF 946, and act as a transparent proxy for routing SM messages. AMF 944 may also provide transport for SMS messages between UE 902 and an SMSF. AMF 944 may interact with the AUSF 942 and the UE 902 to perform various security anchor and context management functions. Furthermore, AMF 944 may be a termination point of a RAN CP interface, which may include or be an N2 reference point between the RAN 904 and the AMF 944; and the AMF 944 may be a termination point of NAS (N1) signaling, and perform NAS ciphering and integrity protection. AMF 944 may also support NAS signaling with the UE 902 over an N3 IWF interface.

The SMF 946 may be responsible for SM (for example, session establishment, tunnel management between UPF 948 and AN 908); UE IP address allocation and management (including optional authorization); selection and control of UP function; configuring traffic steering at UPF 948 to route traffic to proper destination; termination of interfaces toward policy control functions; controlling part of policy enforcement, charging, and QoS; lawful intercept (for SM events and interface to LI system); termination of SM parts of NAS messages; downlink data notification; initiating AN specific SM information, sent via AMF 944 over N2 to AN 908; and determining SSC mode of a session. SM may refer to management of a PDU session, and a PDU session or "session" may refer to a PDU connectivity service that provides or enables the exchange of PDUs between the UE 902 and the data network 936.

The UPF 948 may act as an anchor point for intra-RAT and inter-RAT mobility, an external PDU session point of interconnect to data network 936, and a branching point to support multi-homed PDU session. The UPF 948 may also perform packet routing and forwarding, perform packet inspection, enforce the user plane part of policy rules, lawfully intercept packets (UP collection), perform traffic usage reporting, perform QoS handling for a user plane (e.g., packet filtering, gating, UL/DL rate enforcement), perform uplink traffic verification (e.g., SDF-to-QoS flow mapping), transport level packet marking in the uplink and downlink, and perform downlink packet buffering and downlink data notification triggering. UPF 948 may include an uplink classifier to support routing traffic flows to a data network.

The NSSF 950 may select a set of network slice instances serving the UE 902. The NSSF 950 may also determine allowed NSSAI and the mapping to the subscribed S-NSSAIs, if needed. The NSSF 950 may also determine the AMF set to be used to serve the UE 902, or a list of candidate AMFs based on a suitable configuration and possibly by querying the NRF 954. The selection of a set of network slice instances for the UE 902 may be triggered by the AMF 944 with which the UE 902 is registered by interacting with the NSSF 950, which may lead to a change of AMF. The NSSF 950 may interact with the AMF 944 via an N22 reference point; and may communicate with another NSSF in a visited network via an N31 reference point (not shown). Additionally, the NSSF 950 may exhibit an Nnssf service-based interface.

The NEF 952 may securely expose services and capabilities provided by 3GPP network functions for third party, internal exposure/re-exposure, AFs (e.g., AF 960), edge computing or fog computing systems, etc. In such embodiments, the NEF 952 may authenticate, authorize, or throttle the AFs. NEF 952 may also translate information exchanged with the AF 960 and information exchanged with internal network functions. For example, the NEF 952 may translate between an AF-Service-Identifier and an internal 5GC information. NEF 952 may also receive information from other NFs based on exposed capabilities of other NFs. This information may be stored at the NEF 952 as structured data, or at a data storage NF using standardized interfaces. The stored information can then be re-exposed by the NEF 952 to other NFs and AFs, or used for other purposes such as analytics. Additionally, the NEF 952 may exhibit an Nnef service-based interface.

The NRF 954 may support service discovery functions, receive NF discovery requests from NF instances, and provide the information of the discovered NF instances to the NF instances. NRF 954 also maintains information of available NF instances and their supported services. As used herein, the terms "instantiate," "instantiation," and the like may refer to the creation of an instance, and an "instance" may refer to a concrete occurrence of an object, which may occur, for example, during execution of program code. Additionally, the NRF 954 may exhibit the Nnrf service-based interface.

The PCF 956 may provide policy rules to control plane functions to enforce them, and may also support unified policy framework to govern network behavior. The PCF 956 may also implement a front end to access subscription information relevant for policy decisions in a UDR of the UDM 958. In addition to communicating with functions over reference points as shown, the PCF 956 exhibit an Npcf service-based interface.

The UDM 958 may handle subscription-related information to support the network entities' handling of communication sessions, and may store subscription data of UE 902. For example, subscription data may be communicated via an N8 reference point between the UDM 958 and the AMF 944. The UDM 958 may include two parts, an application front end and a UDR. The UDR may store subscription data and policy data for the UDM 958 and the PCF 956, and/or structured data for exposure and application data (including PFDs for application detection, application request information for multiple UEs 902) for the NEF 952. The Nudr service-based interface may be exhibited by the UDR 221 to allow the UDM 958, PCF 956, and NEF 952 to access a particular set of the stored data, as well as to read, update (e.g., add, modify), delete, and subscribe to notification of relevant data changes in the UDR. The UDM may include a UDM-FE, which is in charge of processing credentials, location management, subscription management and so on. Several different front ends may serve the same user in different transactions. The UDM-FE accesses subscription information stored in the UDR and performs authentication credential processing, user identification handling, access authorization, registration/mobility management, and subscription management. In addition to communicating with other NFs over reference points as shown, the UDM 958 may exhibit the Nudm service-based interface.

The AF 960 may provide application influence on traffic routing, provide access to NEF, and interact with the policy framework for policy control.

In some embodiments, the 5GC 940 may enable edge computing by selecting operator/$3^{rd}$ party services to be geographically close to a point that the UE 902 is attached to the network. This may reduce latency and load on the network. To provide edge-computing implementations, the 5GC 940 may select a UPF 948 close to the UE 902 and execute traffic steering from the UPF 948 to data network 936 via the N6 interface. This may be based on the UE subscription data, UE location, and information provided by the AF 960. In this way, the AF 960 may influence UPF (re) selection and traffic routing. Based on operator deployment, when AF 960 is considered to be a trusted entity, the network operator may permit AF 960 to interact directly with relevant NFs. Additionally, the AF 960 may exhibit an Naf service-based interface.

The data network 936 may represent various network operator services, Internet access, or third party services that may be provided by one or more servers including, for example, application/content server 938.

FIG. 10 schematically illustrates a wireless network 1000 in accordance with various embodiments. The wireless network 1000 may include a UE 1002 in wireless communication with an AN 1004. The UE 1002 and AN 1004 may be similar to, and substantially interchangeable with, like-named components described elsewhere herein.

The UE 1002 may be communicatively coupled with the AN 1004 via connection 1006. The connection 1006 is illustrated as an air interface to enable communicative coupling, and can be consistent with cellular communications protocols such as an LTE protocol or a 5G NR protocol operating at mmWave or sub-6 GHZ frequencies.

The UE 1002 may include a host platform 1008 coupled with a modem platform 1010. The host platform 1008 may include application processing circuitry 1012, which may be coupled with protocol processing circuitry 1014 of the modem platform 1010. The application processing circuitry 1012 may run various applications for the UE 1002 that source/sink application data. The application processing circuitry 1012 may further implement one or more layer operations to transmit/receive application data to/from a data network. These layer operations may include transport (for example UDP) and Internet (for example, IP) operations The protocol processing circuitry 1014 may implement one or more of layer operations to facilitate transmission or reception of data over the connection 1006. The layer operations implemented by the protocol processing circuitry 1014 may include, for example, MAC, RLC, PDCP, RRC and NAS operations.

The modem platform 1010 may further include digital baseband circuitry 1016 that may implement one or more layer operations that are "below" layer operations performed by the protocol processing circuitry 1014 in a network protocol stack. These operations may include, for example, PHY operations including one or more of HARQ-ACK functions, scrambling/descrambling, encoding/decoding, layer mapping/de-mapping, modulation symbol mapping, received symbol/bit metric determination, multi-antenna port precoding/decoding, which may include one or more of space-time, space-frequency or spatial coding, reference signal generation/detection, preamble sequence generation and/or decoding, synchronization sequence generation/detection, control channel signal blind decoding, and other related functions.

The modem platform 1010 may further include transmit circuitry 1018, receive circuitry 1020, RF circuitry 1022, and RF front end (RFFE) 1024, which may include or connect to one or more antenna panels 1026. Briefly, the transmit circuitry 1018 may include a digital-to-analog converter, mixer, intermediate frequency (IF) components, etc.; the receive circuitry 1020 may include an analog-to-digital converter, mixer, IF components, etc.; the RF circuitry 1022 may include a low-noise amplifier, a power amplifier, power tracking components, etc.; RFFE 1024 may include filters (for example, surface/bulk acoustic wave filters), switches, antenna tuners, beamforming components (for example, phase-array antenna components), etc. The selection and arrangement of the components of the transmit circuitry 1018, receive circuitry 1020, RF circuitry 1022, RFFE 1024, and antenna panels 1026 (referred generically as "transmit/receive components") may be specific to details of a specific implementation such as, for example, whether communication is TDM or FDM, in mmWave or sub-6 gHz frequencies, etc. In some embodiments, the transmit/receive components may be arranged in multiple parallel transmit/receive chains, may be disposed in the same or different chips/modules, etc.

In some embodiments, the protocol processing circuitry 1014 may include one or more instances of control circuitry (not shown) to provide control functions for the transmit/receive components.

A UE reception may be established by and via the antenna panels 1026, RFFE 1024, RF circuitry 1022, receive circuitry 1020, digital baseband circuitry 1016, and protocol processing circuitry 1014. In some embodiments, the antenna panels 1026 may receive a transmission from the AN 1004 by receive-beamforming signals received by a plurality of antennas/antenna elements of the one or more antenna panels 1026.

A UE transmission may be established by and via the protocol processing circuitry 1014, digital baseband circuitry 1016, transmit circuitry 1018, RF circuitry 1022, RFFE 1024, and antenna panels 1026. In some embodiments, the transmit components of the UE 1004 may apply a spatial filter to the data to be transmitted to form a transmit beam emitted by the antenna elements of the antenna panels 1026.

Similar to the UE 1002, the AN 1004 may include a host platform 1028 coupled with a modem platform 1030. The host platform 1028 may include application processing circuitry 1032 coupled with protocol processing circuitry 1034 of the modem platform 1030. The modem platform may further include digital baseband circuitry 1036, transmit circuitry 1038, receive circuitry 1040, RF circuitry 1042, RFFE circuitry 1044, and antenna panels 1046. The components of the AN 1004 may be similar to and substantially interchangeable with like-named components of the UE 1002. In addition to performing data transmission/reception as described above, the components of the AN 1008 may perform various logical functions that include, for example, RNC functions such as radio bearer management, uplink and downlink dynamic radio resource management, and data packet scheduling.

Figure 11:
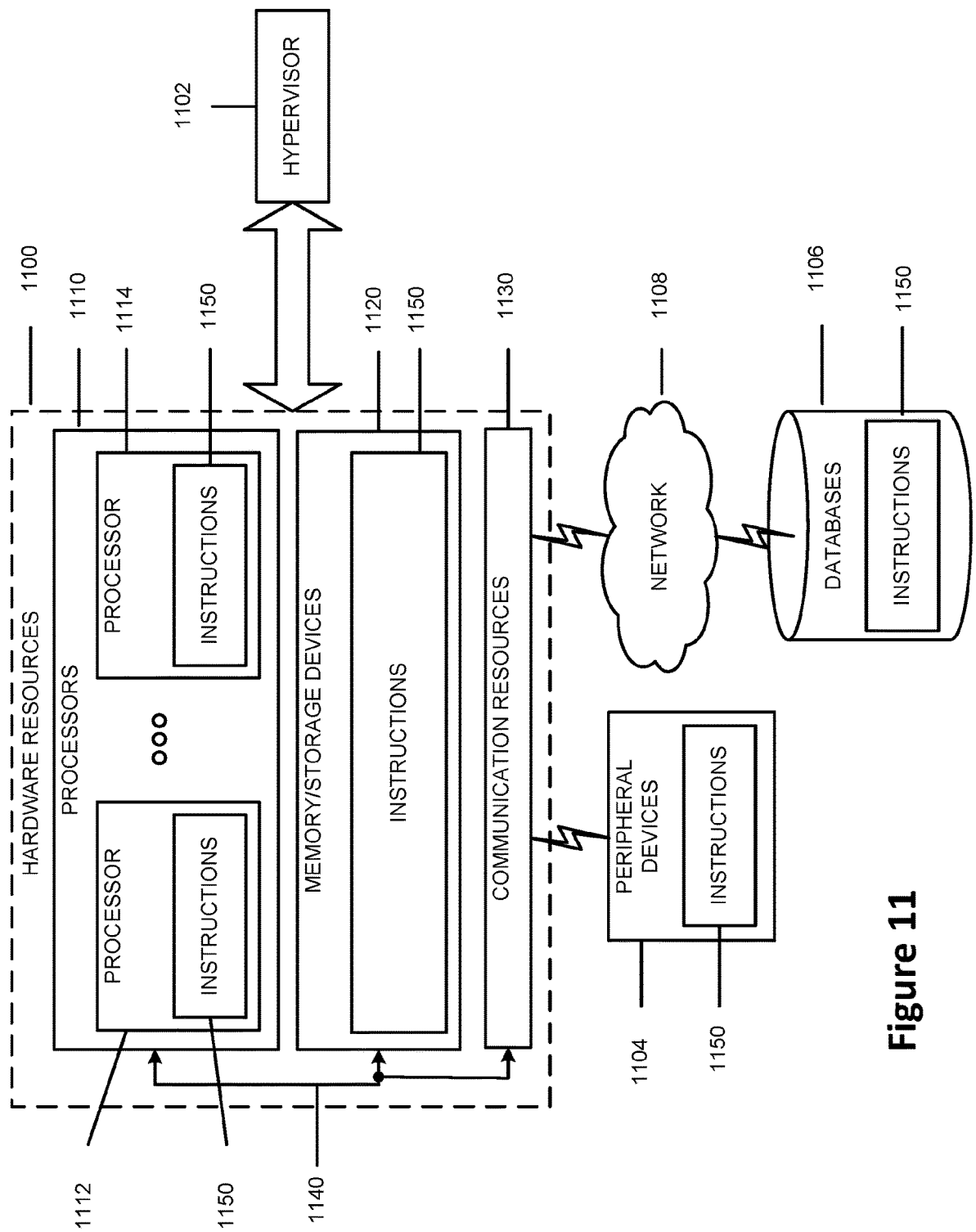
FIG. 11 is a block diagram illustrating components, according to some example embodiments, able to read instructions from a machine-readable or computer-readable medium (e.g., a non-transitory machine-readable storage medium) and perform any one or more of the methodologies discussed herein.

FIG. 11 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 11 shows a diagrammatic representation of hardware resources 1100 including one or more processors (or processor cores) 1110, one or more memory/storage devices 1120, and one or more communication resources 1130, each of which may be communicatively coupled via a bus 1140 or other interface circuitry. For embodiments where node virtualization (e.g., NFV) is utilized, a hypervisor 1102 may be executed to provide an execution environment for one or more network slices/sub-slices to utilize the hardware resources 1100.

The processors 1110 may include, for example, a processor 1112 and a processor 1114. The processors 1110 may be, for example, a central processing unit (CPU), a reduced instruction set computing (RISC) processor, a complex instruction set computing (CISC) processor, a graphics processing unit (GPU), a DSP such as a baseband processor, an ASIC, an FPGA, a radio-frequency integrated circuit (RFIC), another processor (including those discussed herein), or any suitable combination thereof.

The memory/storage devices 1120 may include main memory, disk storage, or any suitable combination thereof. The memory/storage devices 1120 may include, but are not limited to, any type of volatile, non-volatile, or semi-volatile memory such as dynamic random access memory (DRAM), static random access memory (SRAM), erasable programmable read-only memory (EPROM), electrically erasable programmable read-only memory (EEPROM), Flash memory, solid-state storage, etc.

The communication resources 1130 may include interconnection or network interface controllers, components, or other suitable devices to communicate with one or more peripheral devices 1104 or one or more databases 1106 or other network elements via a network 1108. For example, the communication resources 1130 may include wired communication components (e.g., for coupling via USB, Ethernet, etc.), cellular communication components, NFC components, Bluetooth® (or Bluetooth® Low Energy) components, Wi-Fi® components, and other communication components.

Instructions 1150 may comprise software, a program, an application, an applet, an app, or other executable code for causing at least any of the processors 1110 to perform any one or more of the methodologies discussed herein. The instructions 1150 may reside, completely or partially, within at least one of the processors 1110 (e.g., within the processor's cache memory), the memory/storage devices 1120, or any suitable combination thereof. Furthermore, any portion of the instructions 1150 may be transferred to the hardware resources 1100 from any combination of the peripheral devices 1104 or the databases 1106. Accordingly, the memory of processors 1110, the memory/storage devices 1120, the peripheral devices 1104, and the databases 1106 are examples of computer-readable and machine-readable media.

Example Procedures

Figure 12:
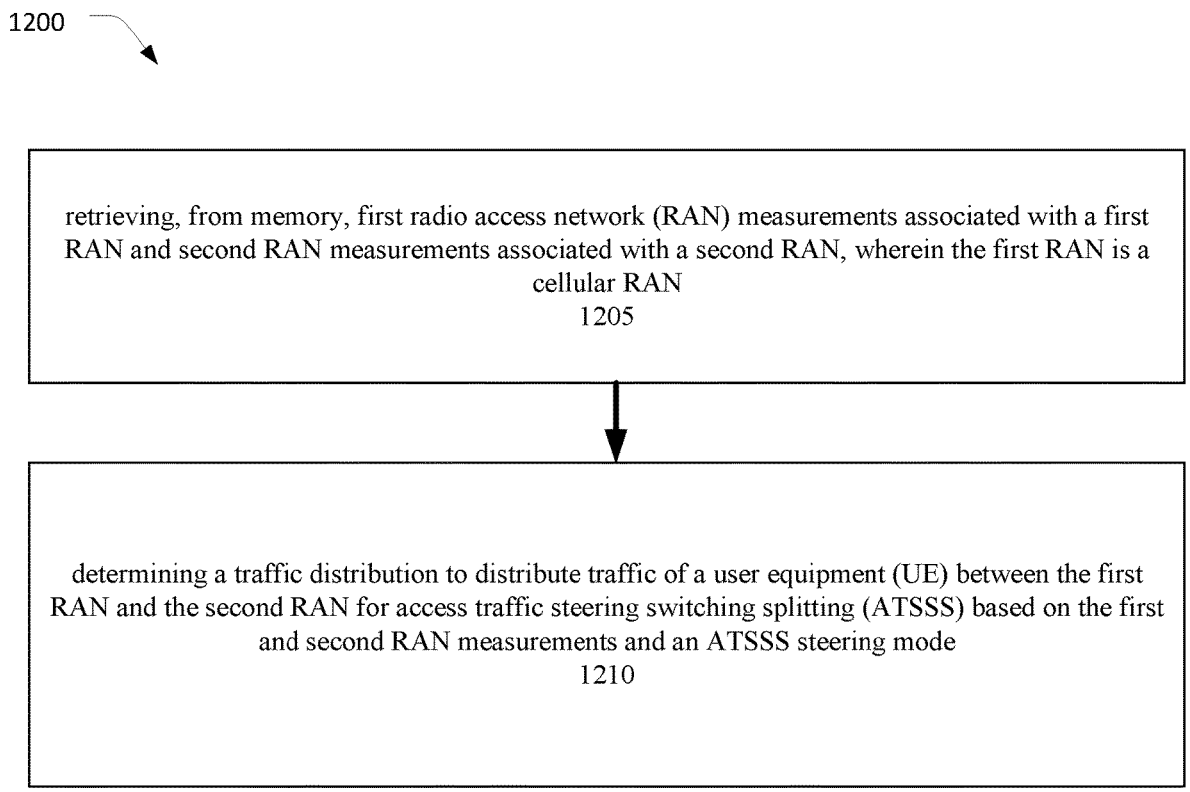
FIG. 12 depicts an example procedure for practicing the various embodiments discussed herein.

In some embodiments, the electronic device(s), network(s), system(s), chip(s) or component(s), or portions or implementations thereof, of FIGS. 9-11, or some other figure herein, may be configured to perform one or more processes, techniques, or methods as described herein, or portions thereof. One such process is depicted in FIG. 12.

For example, the process 1200 may include, at 1205, retrieving, from memory, first radio access network (RAN) measurements associated with a first RAN and second RAN measurements associated with a second RAN, wherein the first RAN is a cellular RAN. The process further includes, at 1210, determining a traffic distribution to distribute traffic of a user equipment (UE) between the first RAN and the second RAN for access traffic steering switching splitting (ATSSS) based on the first and second RAN measurements and an ATSSS steering mode.

Figure 13:
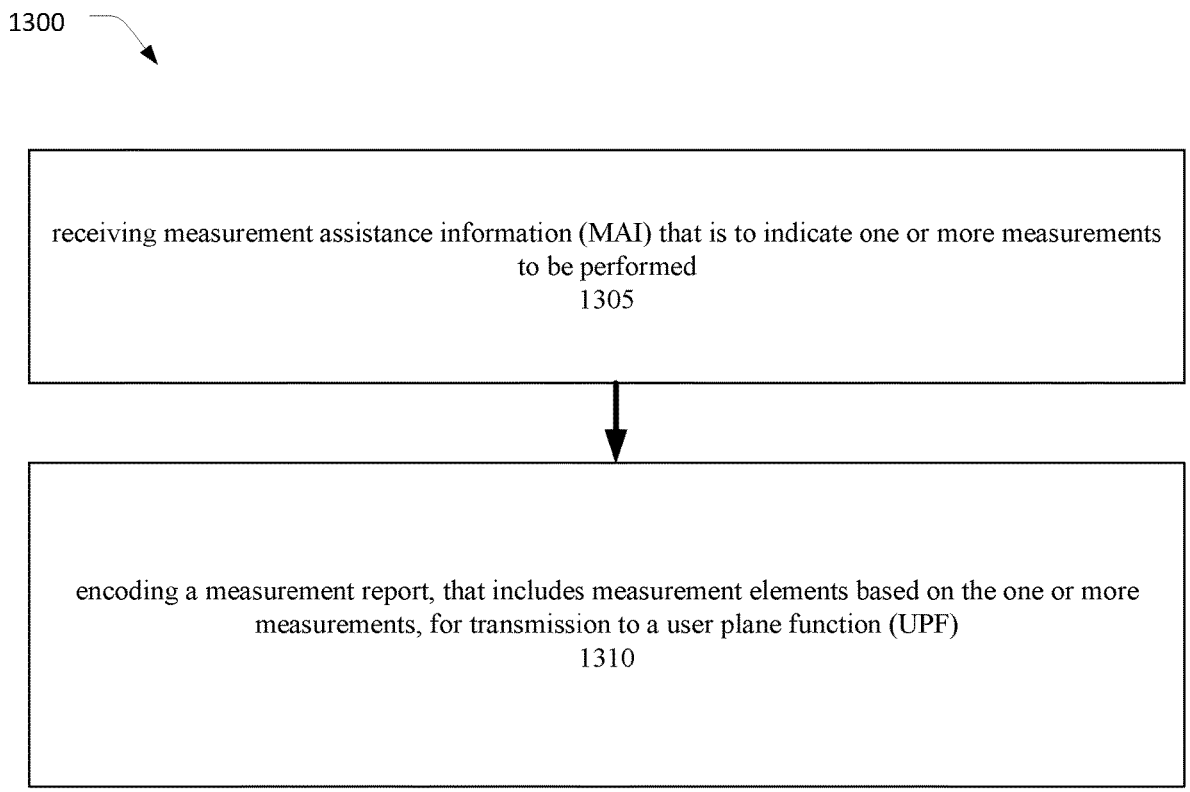
FIG. 13 depicts another example procedure for practicing the various embodiments.

FIG. 13 illustrates another process in accordance with various embodiments. In this example, the process 1300 includes, at 1305, receiving measurement assistance information (MAI) that is to indicate one or more measurements to be performed. The process further includes, at 1310, encoding a measurement report, that includes measurement elements based on the one or more measurements, for transmission to a user plane function (UPF).

Figure 14:
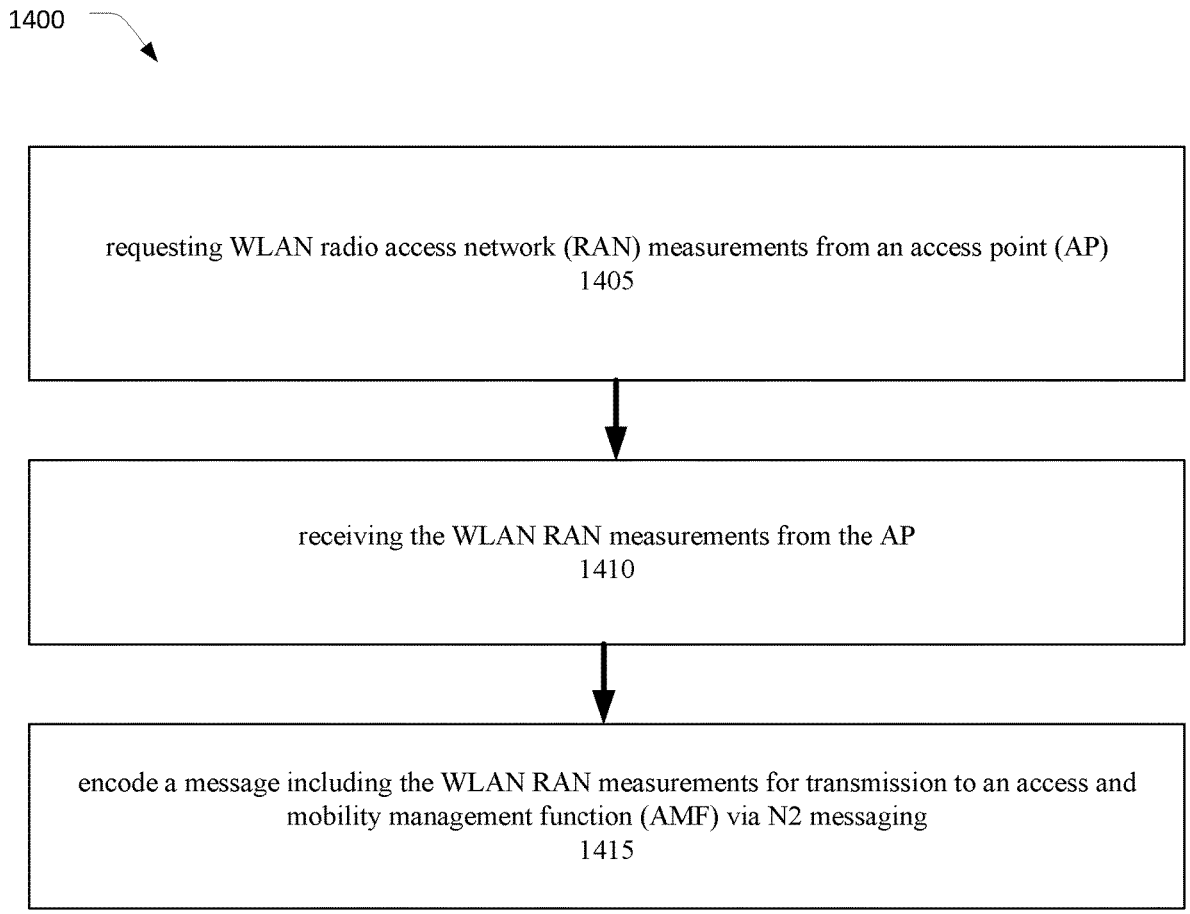
FIG. 14 depicts another example procedure for practicing the various embodiments.

FIG. 14 illustrates another process in accordance with various embodiments. In this example, the process 1400 includes, at 1405, requesting WLAN radio access network (RAN) measurements from an access point (AP). The process further includes, at 1410, receiving the WLAN RAN measurements from the AP. The process further includes, at 1415, encode a message including the WLAN RAN measurements for transmission to an access and mobility management function (AMF) via N2 messaging.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

Examples

Example 1 may include a method of operating a 5G system which includes a UE, NG-RAN, AMF, SMF, PCF, UDM, TNGF, N3IWF, WLAN Access and other essential elements as described in 3GPP TS 23.501, 16.4.0, 2020 Mar. 27, and TS 23.502, 16.4.0, 2020 Mar. 27.

Example 2 may include the method of example 1 or some other example herein, where if the RAN measurements based ATSSS steering modes are supported the AMF requests WLAN RAN measurements for ATSSS from the TNGF over N2 messaging.

Example 3 may include the method of example 2 or some other example herein, where the AMF can request WLAN RAN measurements from the TNGF per AP basis and/or per STA basis and reporting can be requested on-demand or on a periodic basis.

Example 4 may include the method of example 3 or some other example herein, where the AMF sends an ATSSS RAN Measurement Notification request to TNGF which identifies the type of measurements requested (per AP and/or per STA) and also contain a reporting type which indicates if the reporting type is periodic reporting or on demand reporting.

Example 5 may include the method of example 4 or some other example herein, where the TNGF requests WLAN RAN measurements from the TNAP (WLAN AP) over the AAA interface (Ta) using EAP-Request/Response messages.

Example 6 may include the method of example 5 or some other example herein, where the WLAN AP sends WLAN RAN measurements to TNGF over the AAA interface (Ta).

Example 7 may include the method of example 6 or some other example herein, where the TNGF sends an ATSSS RAN Measurement Report to the AMF providing WLAN RAN measurements as per the EAP-Request received from the AMF.

Example 8 may include the method of example 7 or some other example herein, where the AMF sends the ATSSS RAN Measurement Report received from the TNGF to the SMF providing WLAN RAN measurements for RAN measurements based ATSSS.

Example 9 may include the method of example 8 or some other example herein, where the SMF may decide to update ATSSS rules and/or N4 rules based on WLAN RAN measurements report received from the TNGF and the SMF sends updated N4 rules to the UPF.

Example 10 may include the method of example 9 or some other example herein, where the SMF may update the ATSSS rules on the UE through the PDU Session modification procedure as per TS 23.502.

Example 11 may include the method of example 10 or some other example herein, where the SMF may send ATSSS rules to UPF and ATSSS rules are updated on the UE through in-band ATSSS Rule Update message sent over PMF messaging.

Example 12 may include the method of example 4 or some other example herein, where the AMF can send a Cancel ATSSS RAN Measurement Report message to inform the TNGF that it should terminate sending WLAN RAN measurement notifications to the TNGF. Example 13 may include example 5 or some other example herein, where the TNGF requests WLAN RAN measurements from the TNAP (WLAN AP) using EAP-5G protocol messages.

Example 14 may include the method of example 13 or some other example herein, where the TNGF sends the EAP-5G message EAP-Request/5G-ATSSS-WLAN-RAN-Measurements-Request to the WLAN AP to request WLAN RAN measurements where the request identifies the type of measurements requested (per AP and/or per STA) and also contain a reporting type which indicates if the reporting type is periodic reporting or on demand reporting.

Example 15 may include the method of example 14 or some other example herein, where the EAP-Request/5G-ATSSS-WLAN-RAN-Measurements-Request may optionally specify WLAN measurements elements which should be reported.

Example 16 may include the method of example 15 or some other example herein, where the WLAN AP sends the EAP-5G message EAP-Response/5G-ATSSS-WLAN-RAN-Measurements-Report to send WLAN RAN measurements report to the TNGF in response to the request received from the TNGF.

Example 17 may include the method of example 16 or some other example herein, where the WLAN AP sends the EAP-5G message EAP-Request/5G-ATSSS-WLAN-RAN-Measurements-Report to the TNGF to report WLAN RAN measurements to TNGF as part of periodic reporting.

Example 18 may include the method of example 17 or some other example herein, where the TNGF sends the EAP-5G message EAP-Response/5G-ATSSS-WLAN-RAN-Measurements-Report-Ack to the WLAN AP to acknowledge receipt of WLAN measurements report.

Example 19 may include the method of example 2 or some other example herein, where if the RAN measurements based ATSSS steering modes are supported the AMF requests WLAN RAN measurements for ATSSS from the TNGF over N2 messaging.

Example 20 may include the method of example 1 or some other example herein, where the UPF requests WLAN measurements from the UE on-demand by sending a UE ATSSS RAN Measurement Request to the UE.

Example 21 may include the method of example 20 or some other example herein, where the UE sends a UE ATSSS RAN Measurement Report to the UPF to send the UE local RAN measurements for WLAN.

Example 22 may include the method of example 1 or some other example herein, where the UE sends the UE ATSSS RAN Measurement Report to the UPF periodically to report UE local WLAN measurements based on request made in the Measurement Assistance Information sent to the UE during PDU Session procedures.

Example 23 includes a method comprising:
requesting wireless local area network (WLAN) radio access network (RAN) measurements from an access point (AP);
receiving the WLAN RAN measurements from the AP; and
encoding a message including the WLAN RAN measurements for transmission to an access and mobility management function (AMF) via N2 messaging.

Example 24 includes the method of example 23 or some other example herein, wherein the AP is a trusted WLAN access point (TNAP) or a WLAN AP.

Example 25 includes the method of example 23 or some other example herein, wherein the WLAN RAN measurements are requested over an authentication authorization and accounting (AAA) interface.

Example 26 includes the method of example 23 or some other example herein, wherein the WLAN RAN measurements are requested using an extensible authentication protocol (EAP) request.

Example 27 includes the method of example 26 or some other example herein, wherein the EAP request is a 5G-ATSSS-WLAN-RAN-Measurements-Request message that is to request WLAN RAN measurements from a WLAN AP.

Example 28 includes the method of example 27 or some other example herein, wherein the 5G-ATSSS-WLAN-RAN-Measurements-Request message is to specify a reporting type for WLAN measurements.

Example 29 includes the method of example 28 or some other example herein, wherein the reporting type is an on-demand reporting type or a periodic reporting type.

Example 30 includes the method of example 23 or some other example herein, wherein the WLAN measurements are received via an EAP response message.

Example 31 includes the method of example 30 or some other example herein, wherein the EAP response message is a 5G-ATSSS-WLAN-RAN-Measurements-Report message that includes the WLAN RAN measurements.

Example 32 includes the method of example 31 or some other example herein, wherein the 5G-ATSSS-WLAN-RAN-Measurements-Report message is received as part of periodic reporting.

Example 33 includes the method of any of examples 23-32 or some other example herein, wherein the method is performed by a trusted WLAN gateway function (TNGF) or portion thereof.

Example A1 may include a method of operating a 5G system including a UE, NG-RAN, AMF, SMF, PCF, UDM, TNGF, N3IWF, WLAN Access and other essential elements as described in 3GPP TS 23.501, v. 16.4.0, 2020 Mar. 27, and TS 23.502, v. 16.4.0, 2020 Mar. 27.

Example A2 may include the method of example A1 or some other example herein, where if the UE is capable of supporting RAN measurement feedback based steering modes, the network may send Measurement Assistance Information for the UE during the MA PDU Session establishment to send UE ATSSS RAN Measurement Report to the UPF.

Example A3 may include the method of example A2 or some other example herein, where the UE ATSSS RAN measurement report includes UE RAN measurements elements for both NR and WLAN access based on the request for UE measurements to be reported in the Measurement Assistance Information.

Example A4 may include the method of examples A2 and A3 or some other example herein, where the PMF protocol messages exchanged between UE and UPF includes messages for UE ATSSS RAN Measurement Report by the UE to the UPF and message to update UE ATSSS rules from UPF to UE.

Example A5 may include the method of examples A2 to A4 or some other example herein, where the AMF sends a request to NG-RAN to report measurement from NG-RAN.

Example A6 may include the method of example A5 or some other example herein, where the AMF forwards the ATSSS RAN Measurement Data to the SMF, once the ATSSS RAN measurement report is received from the NG-RAN.

Example A7 may include the method of examples A5 and A6 or some other example herein, where the SMF based on the ATSSS RAN Measurement Data received from NG-RAN decides if the N4 rules or ATSSS rules need to be updated.

Example A8 may include the method of example A7 or some other example herein, where the SMF sends a N4 Session Modification Request to the UPF to update the N4 rules and/or ATSSS rules Example A9 may include the method of example A8 or some other example herein, where if the ATSSS rules update in UE is required and if the UE supports capability to receive ATSSS rules update over PMF messaging, the PMF in the UPF sends UE ATSSS Rule Update Request to the UE.

Example A10 may include the method of example A9 or some other example herein, where the UE sends back a UE ATSSS Rule Update Complete response message to the UPF after it updates the ATSSS rules locally.

Example A11 may include the method of examples A1 to A4 or some other example herein, where the UE ATSSS RAN Measurement Report may be sent periodically by the UE to the UPF based on request made in the Measurement Assistance Information or the UPF may request the UE ATSSS RAN Measurement report on demand from the UE.

Example A12 may include the method of example A11 or some other example herein, where the UE ATSSS RAN Measurement Report is sent from UPF to SMF based on which the SMF can decide if the ATSSS rules in the UE or N4 rules in the UPF needs to be updated.

Example A13 includes a method comprising:
receiving measurement assistance information (MAI) that is to indicate one or more measurements to be performed;
performing the one or more measurements based on the MAI; and
encoding a measurement report, that includes measurement elements based on the one or more measurements, for transmission to a user plane function (UPF).

Example A14 includes the method of example A13 or some other example herein, wherein the measurement report is a user equipment (UE) access traffic steering switching splitting (ATSSS) radio access network (RAN) measurement report.

Example A15 includes the method of example A13 or some other example herein, wherein the measurement report includes a UE RAN measurement element for new radio (NR) access or wireless local area network (WLAN) access.

Example A16 includes the method of example A13 or some other example herein, further comprising receiving, from the UPF, a UE ATSSS rule update request message.

Example A17 includes the method of example 16 or some other example herein, further comprising:
updating a rule based on the UE ATSSS rule update request; and
encoding a UE ATSSS rule update complete message for transmission to the UPF.

Example A18 includes the method of any of examples A13-A17 or some other example herein, wherein the method is performed by a user equipment (UE) or portion thereof.

Example A19 includes a method comprising:
receiving an ATSSS RAN measurement report that includes ATSSS RAN measurement data;
determining, based on the ATSSS RAN measurement data, that an N4 rule or an ATSSS rule is to be updated; and
encoding an N4 session modification request for transmission to a UPF identifying the N4 rule or ATSSS rule that is to be updated.

Example A20 includes the method of example A19 or some other example herein, wherein the N4 session modification request identifies both an N4 rule to be updated and an ATSSS rule to be updated.

Example A21 includes the method of example A19 or some other example herein, wherein the N4 session modification request identifies a plurality of N4 rules to be updated and a plurality of ATSSS rules to be updated.

Example A22 includes the method of example A19 or some other example herein, wherein the method further comprises receiving, from the UPF, an N4 session modification response that is to indicate that the N4 rule or the ATSSS rule has been updated.

Example A23 includes the method of any of examples A19-A22 or some other example herein, wherein the method is performed by a session management function (SMF).

Example B1 may include a 5G system which consists of UE, NG-RAN, AMF, SMF, PCF, UDM, TNGF, N3IWF, WLAN Access and other essential elements as described in 3GPP TS 23.501 and TS 23.502.

Example B2 may include the 5G system of example B1 or some other example herein, where the UE capabilities negotiated between UE and 5GC includes the Load balancing with RAN measurement steering mode that determines the percentage of the SDF traffic that should be sent over 3GPP access and over non-3GPP access by the SMF based on the RAN measurements sent from NG-RAN to the SMF, Wi-Fi RAN measurements received from WLAN AP and additional local UE RAN measurements for NR or Wi-Fi links received from the UE over PMF messaging.

Example B3 may include the method of examples B1 and B2 or some other example herein, where whenever load balancing split percentage is updated based on RAN measurements, ATSSS rule on the UE needs to be updated.

Example B4 may include the 5G system of example B1 or some other example herein, where the UE capabilities negotiated between UE and 5GC includes the Priority-based with RAN measurement steering mode for which UE and UPF determine when a congestion occurs on an access based on the RAN measurements sent from NG-RAN to the SMF, Wi-Fi RAN measurements received from WLAN AP, UE RAN measurements for NR or Wi-Fi links sent over PMF messaging and local RAN measurements at the UE.

Example B5 may include the 5G system of example B1 and example B4 or some other example herein, where this mode could optionally specify overall load threshold to determine congestion for a given access at the UE.

Example B6 may include examples B4 and B5 or some other example herein, where ATSSS rule may be updated if high-priority access is changed based on RAN measurements.

Example B7 may include the 5G system of example 1 or some other example herein, where the UE capabilities negotiated between UE and 5GC includes the Dynamic traffic steering with RAN measurement which allows support for proprietary algorithms for dynamically scheduling traffic over two accesses on the UPF and UE, based on RAN measurements from NR and Wi-Fi access and local RAN measurements received from the UE for NR or Wi-Fi links over PMF messaging. enabling performance differentiation.

Example B8 may include the method of examples B3, B4, B5, B6, B7, or some other example herein, where the determination of whether the network allows RAN measurement based ATSSS is done as part of the PCC rules from PCF (if dynamic PCC is supported) to SMF during MA PDU session establishment procedure.

Example B9 may include the method of examples B3, B4, B5, B6, B7, or some other example herein, where the determination of whether the network allows RAN measurement based ATSSS is done based on the UE subscription when the SMF checks with the UDM if the UE subscription allows RAN measurements based ATSSS during MA PDU session establishment procedure.

Example B10 may include the method of examples B2 to B9 or some other example herein, where if the MA PDU session is accepted by the network, the AMF may include in the N2 SM information sent to NG-RAN or N3IWF or TNGF an MA PDU session accepted indication which is used by NG-RAN, N3IWF and TNGF to mark the PDU session as a MA PDU session.

Example B11 may include the method of example B10 or some other example herein, where if the MA PDU session is accepted by the network, the AMF may include in the N2 SM information sent to the NG-RAN or N3IWF or TNGF a RAN measurement based steering indication that indicates that RAN measurement feedback is required for the PDU session.

Example B12 may include the method of examples B2 to B11 or some other example herein, where if RAN measurement based ATSSS is allowed then the SMF may update ATSSS rules and/or N4 rules based on the RAN measurement report received from NG-RAN or Wi-Fi measurement report received from TNGF or local UE RAN measurements for NR or Wi-Fi received from the UE over PMF messaging.

Example B13 may include the method of examples B10 to B12 or some other example herein, where N2 Measurement Notification procedure is used by the AMF to request the NG-RAN or TNGF to report RAN measurements for ATSSS.

Example B14 may include the method of example B13 or some other example herein, where reporting of RAN measurements from NG-RAN can be requested per UE by AMF or continuous reporting of NG-RAN measurements per CellID basis can be requested by AMF or enabled by operator local configuration.

Example B15 may include the method of example B13 or some other example herein, where AMF sends an ATSSS RAN measurement Notification Request to the NG-RAN which identifies the UE for which notification(s) are requested and may contain a reporting type which indicates if the reporting type is periodic reporting or on demand reporting.

Example B16 may include the method of examples B13 and B15 or some other example herein, where the NG-RAN sends the ATSSS RAN measurement report message to report the RAN measurements for a UE or a CellId.

Example B17 may include the method of example B16 or some other example herein, where the ATSSS RAN measurement report message can be periodically reported based on configuration.

Example B18 may include the method of examples B13, B15, B16, B17 or some other example herein, where the AMF can send a Cancel ATSSS RAN Measurement Report message to inform the NG-RAN that it should terminate sending RAN measurement notifications for a given UE or a CellId.

Example B19 may include the method of examples B2 to B11 or some other example herein, where during PDU session establishment procedure if RAN measurement based steering mode is allowed then the SMF subscribes for RAN measurement report from the AMF to receive RAN measurements from NG-RAN or Wi-Fi RAN measurements from TNGF.

Example B20 may include the method of example B19 or some other example herein, where the AMF forwards the N2 SM information including the ATSSS RAN measurement data to the SMF in Nsmf_PDUSession_UpdateSMContext Request.

Example B21 may include the method of examples B19 and B20 or some other example herein, where the SMF acknowledges receiving the ATSSS RAN measurement data back to the AMF.

Example B22 may include the method of example B9 or some other example herein, where the UE session management subscription data includes one indicator e.g., RAN measurement for ATSSS to indicate if RAN measurement based ATSSS steering modes are allowed or not.

Example B23 may include the method of example B9 or some other example herein, where the UE session management subscription data includes separate indicators for Load balancing with RAN measurement, Priority based with RAN measurement, Dynamic traffic steering with RAN measurement to indicate whether RAN measurement for ATSSS is allowed for each of these steering modes.

Example B24 may include the 5G system of example B1 or some other example herein, where the UE capabilities negotiated between UE and 5GC includes the UE support for receiving updates to ATSSS rules over PMF messaging.

Example B25 may include a method comprising:
receiving first RAN measurements associated with a first radio access network (RAN) and second RAN measurements associated with a second RAN, wherein the first RAN is a cellular RAN; and
determining a traffic distribution to distribute traffic of a UE between the first RAN and the second RAN for ATSSS based on the first and second RAN measurements and a steering mode used for ATSSS.

Example B26 may include the method of example B25 or some other example herein, wherein the first RAN measurements include measurements received from an NG-RAN node and/or the UE.

Example B27 may include the method of example B25-B26 or some other example herein, wherein the second RAN is a WLAN.

Example B28 may include the method of example B27 or some other example herein, wherein the second RAN measurements are received from the WLAN and/or the UE.

Example B29 may include the method of example B25-B28 or some other example herein, wherein the steering mode is a load-balancing mode, a priority-based mode, or a dynamic traffic steering mode.

Example B30 may include the method of example B25-B29 or some other example herein, further comprising retrieving Session Management subscription data including information to indicate one or more allowed steering modes.

Example B31 may include the method of example B30 or some other example herein, wherein the information includes a single indicator is to indicate whether or not ATSSS steering modes based on RAN measurements are allowed.

Example B32 may include the method of example B30 or some other example herein, wherein the information includes separate indicators to indicate whether RAN measurement-based steering is allowed for different respective steering modes.

Example B33 may include the method of example B25-B30 or some other example herein, wherein determining the traffic distribution includes updating one or more ATSSS rules and/or N4 rules.

Example B34 may include the method of example B25-B33 or some other example herein, wherein the method is performed by an SMF or a portion thereof.

Example X1 includes an apparatus comprising:
memory to store first radio access network (RAN) measurements associated with a first RAN and second RAN measurements associated with a second RAN, wherein the first RAN is a cellular RAN; and
processing circuitry, coupled with the memory, to:
retrieve the first and second RAN measurements from the memory; and
determine a traffic distribution to distribute traffic of a user equipment (UE) between the first RAN and the second RAN for access traffic steering switching splitting (ATSSS) based on the first and second RAN measurements and an ATSSS steering mode.

Example 2 includes the apparatus of example X1 or some other example herein, wherein the first RAN measurements include measurements received from a next generation RAN (NG-RAN) node or the UE.

Example X3 includes the apparatus of example X1 or some other example herein, wherein the first RAN measurements include measurements received from the second RAN or the UE.

Example X4 includes the apparatus of any of examples X1-X3 or some other example herein, wherein the second RAN is a wireless local area network (WLAN).

Example X5 includes the apparatus of example X1 or some other example herein, wherein the ATSSS steering mode is a load-balancing mode, a priority-based mode, or a dynamic traffic steering mode.

Example X6 includes the apparatus of example X1 or some other example herein, wherein the processing circuitry is further to retrieve session management subscription data that includes information to indicate one or more allowed steering modes.

Example X7 includes the apparatus of example X6 or some other example herein, wherein the information in the session management subscription data includes a single indicator that is to indicate whether or not ATSSS steering modes based on RAN measurements are allowed.

Example X8 includes the apparatus of example X6 or some other example herein, wherein the information in the session management subscription data includes separate indicators to indicate whether RAN measurement-based steering is allowed for different respective steering modes.

Example X9 includes the apparatus of any of examples X1-X9, wherein to determine the traffic distribution is to update one or more ATSSS rules or more N4 rules.

Example X10 includes one or more computer-readable media storing instructions that, when executed by one or more processors, cause a user equipment (UE) to:
receive measurement assistance information (MAI) that is to indicate one or more measurements to be performed; and
encode a measurement report, that includes measurement elements based on the one or more measurements, for transmission to a user plane function (UPF).

Example X11 includes the one or more computer-readable media of example X10 or some other example herein, wherein the measurement report is a UE access traffic steering switching splitting (ATSSS) radio access network (RAN) measurement report.

Example X12 includes the one or more computer-readable media of example X10 or some other example herein, wherein the measurement report includes a UE RAN measurement element for new radio (NR) access or wireless local area network (WLAN) access.

Example X13 includes the one or more computer-readable media of example X10 or some other example herein, wherein the media further stores instructions for causing the UE to:
receive, from the UPF, a UE ATSSS rule update request message.
update a rule based on the UE ATSSS rule update request; and
encode a UE ATSSS rule update complete message for transmission to the UPF.

Example X14 includes one or more computer-readable media storing instructions that, when executed by one or more processors, cause a trusted wireless local area network (WLAN) gateway (TNGF) to:
request WLAN radio access network (RAN) measurements from an access point (AP);
receive the WLAN RAN measurements from the AP; and
encode a message including the WLAN RAN measurements for transmission to an access and mobility management function (AMF) via N2 messaging.

Example X15 includes the one or more computer-readable media of example X14 or some other example herein, wherein the WLAN RAN measurements are requested over an authentication authorization and accounting (AAA) interface.

Example X16 includes the one or more computer-readable media of example X14 or some other example herein, wherein the WLAN RAN measurements are requested using an extensible authentication protocol (EAP) request and received via an EAP response message.

Example X17 includes the one or more computer-readable media of example X16 or some other example herein, wherein the EAP request is a 5G-ATSSS-WLAN-RAN-Measurements-Request message that is to request WLAN RAN measurements from a WLAN AP.

Example X18 includes the one or more computer-readable media of example X17 or some other example herein, wherein the 5G-ATSSS-WLAN-RAN-Measurements-Request message is to specify a reporting type for WLAN measurements.

Example X19 includes the one or more computer-readable media of example X16 or some other example herein, wherein the EAP response message is a 5G-ATSSS-WLAN-RAN-Measurements-Report message that includes the WLAN RAN measurements.

Example X20 includes the one or more computer-readable media of example X19 or some other example herein, wherein the reporting type is an on-demand reporting type or a periodic reporting type.

Example X21 includes the one or more computer-readable media of any of claims X14-X20, wherein the AP is a trusted WLAN access point (TNAP) or a WLAN AP.

Example Z01 may include an apparatus comprising means to perform one or more elements of a method described in or related to any of examples 1-X21, or any other method or process described herein.

Example Z02 may include one or more non-transitory computer-readable media comprising instructions to cause an electronic device, upon execution of the instructions by one or more processors of the electronic device, to perform one or more elements of a method described in or related to any of examples 1-X21, or any other method or process described herein.

Example Z03 may include an apparatus comprising logic, modules, or circuitry to perform one or more elements of a method described in or related to any of examples 1-X21, or any other method or process described herein.

Example Z04 may include a method, technique, or process as described in or related to any of examples 1-X21, or portions or parts thereof.

Example Z05 may include an apparatus comprising: one or more processors and one or more computer-readable media comprising instructions that, when executed by the one or more processors, cause the one or more processors to perform the method, techniques, or process as described in or related to any of examples 1-X21, or portions thereof.

Example Z06 may include a signal as described in or related to any of examples 1-X21, or portions or parts thereof.

Example Z07 may include a datagram, packet, frame, segment, protocol data unit (PDU), or message as described in or related to any of examples 1-X21, or portions or parts thereof, or otherwise described in the present disclosure.

Example Z08 may include a signal encoded with data as described in or related to any of examples 1-X21, or portions or parts thereof, or otherwise described in the present disclosure.

Example Z09 may include a signal encoded with a datagram, packet, frame, segment, protocol data unit (PDU), or message as described in or related to any of examples 1-X21, or portions or parts thereof, or otherwise described in the present disclosure.

Example Z10 may include an electromagnetic signal carrying computer-readable instructions, wherein execution of the computer-readable instructions by one or more processors is to cause the one or more processors to perform the method, techniques, or process as described in or related to any of examples 1-X21, or portions thereof.

Example Z11 may include a computer program comprising instructions, wherein execution of the program by a processing element is to cause the processing element to carry out the method, techniques, or process as described in or related to any of examples 1-X21, or portions thereof.

Example Z12 may include a signal in a wireless network as shown and described herein.

Example Z13 may include a method of communicating in a wireless network as shown and described herein.

Example Z14 may include a system for providing wireless communication as shown and described herein.

Example Z15 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Abbreviations

Unless used differently herein, terms, definitions, and abbreviations may be consistent with terms, definitions, and abbreviations defined in 3GPP TR 21.905 v16.0.0 (2019 June). For the purposes of the present document, the following abbreviations may apply to the examples and embodiments discussed herein.

| | | |
|---|---|---|
| 3GPP | Third Generation Partnership Project | |
| 4G | Fourth Generation | |
| 5G | Fifth Generation | |
| 5GC | 5G Core network | |
| ACK | Acknowledgement | |
| AF | Application Function | |
| AM | Acknowledged Mode | |
| AMBR | Aggregate Maximum Bit Rate | |
| AMF | Access and Mobility Management Function | |
| AN | Access Network | |
| ANR | Automatic Neighbour Relation | |
| AP | Application Protocol, Antenna Port, Access Point | |
| API | Application Programming Interface | |
| APN | Access Point Name | |
| ARP | Allocation and Retention Priority | |
| ARQ | Automatic Repeat Request | |
| AS | Access Stratum | |
| ASN.1 | Abstract Syntax Notation One | |
| AUSF | Authentication Server Function | |
| AWGN | Additive White Gaussian Noise | |
| BAP | Backhaul Adaptation Protocol | |
| BCH | Broadcast Channel | |
| BER | Bit Error Ratio | |
| BFD | Beam Failure Detection | |
| BLER | Block Error Rate | |
| BPSK | Binary Phase Shift Keying | |
| BRAS | Broadband Remote Access Server | |
| BSS | Business Support System | |
| BS | Base Station | |
| BSR | Buffer Status Report | |
| BW | Bandwidth | |
| BWP | Bandwidth Part | |
| C-RNTI | Cell Radio Network Temporary Identity | |
| CA | Carrier Aggregation, Certification Authority | |
| CAPEX | CAPital Expenditure | |
| CBRA | Contention Based Random Access | |
| CC | Component Carrier, Country Code, Cryptographic Checksum | |
| CCA | Clear Channel Assessment | |
| CCE | Control Channel Element | |
| CCCH | Common Control Channel | |
| CE | Coverage Enhancement | |
| CDM | Content Delivery Network | |
| CDMA | Code-Division Multiple Access | |
| CFRA | Contention Free Random Access | |
| CG | Cell Group | |
| CI | Cell Identity | |
| CID | Cell-ID (e.g., positioning method) | |
| CIM | Common Information Model | |
| CIR | Carrier to Interference Ratio | |
| CK | Cipher Key | |
| CM | Connection Management, Conditional Mandatory | |
| CMAS | Commercial Mobile Alert Service | |
| CMD | Command | |
| CMS | Cloud Management System | |
| CO | Conditional Optional | |
| CoMP | Coordinated Multi-Point | |
| CORESET | Control Resource Set | |
| COTS | Commercial Off-The-Shelf | |
| CP | Control Plane, Cyclic Prefix, Connection Point | |
| CPD | Connection Point Descriptor | |
| CPE | Customer Premise Equipment | |
| CPICH | Common Pilot Channel | |
| CQI | Channel Quality Indicator | |
| CPU | CSI processing unit, Central Processing Unit | |
| C/R | Command/Response field bit | |
| CRAN | Cloud Radio Access Network, Cloud RAN | |
| CRB | Common Resource Block | |
| CRC | Cyclic Redundancy Check | |
| CRI | Channel-State Information Resource Indicator, CSI-RS Resource Indicator | |
| C-RNTI | Cell RNTI | |
| CS | Circuit Switched | |
| CSAR | Cloud Service Archive | |
| CSI | Channel-State Information | |
| CSI-IM | CSI Interference Measurement | |
| CSI-RS | CSI Reference Signal | |
| CSI-RSRP | CSI reference signal received power | |
| CSI-RSRQ | CSI reference signal received quality | |
| CSI-SINR | CSI signal-to-noise and interference ratio | |
| CSMA | Carrier Sense Multiple Access | |
| CSMA/CA | CSMA with collision avoidance | |
| CSS | Common Search Space, Cell-specific Search Space | |
| CTS | Clear-to-Send | |
| CW | Codeword | |
| CWS | Contention Window Size | |
| D2D | Device-to-Device | |
| DC | Dual Connectivity, Direct Current | |
| DCI | Downlink Control Information | |
| DF | Deployment Flavour | |
| DL | Downlink | |
| DMTF | Distributed Management Task Force | |
| DPDK | Data Plane Development Kit | |
| DM-RS, DMRS | Demodulation Reference Signal | |

| | | |
|---|---|---|
| DN | Data network | |
| DRB | Data Radio Bearer | |
| DRS | Discovery Reference Signal | |
| DRX | Discontinuous Reception | |
| DSL | Domain Specific Language. Digital Subscriber Line | |
| DSLAM | DSL Access Multiplexer | |
| DwPTS | Downlink Pilot Time Slot | |
| E-LAN | Ethernet Local Area Network | |
| E2E | End-to-End | |
| ECCA | extended clear channel assessment, extended CCA | |
| ECCE | Enhanced Control Channel Element, Enhanced CCE | |
| ED | Energy Detection | |
| EDGE | Enhanced Datarates for GSM Evolution (GSM Evolution) | |
| EGMF | Exposure Governance Management Function | |
| EGPRS | Enhanced GPRS | |
| EIR | Equipment Identity Register | |
| eLAA | enhanced Licensed Assisted Access, enhanced LAA | |
| EM | Element Manager | |
| eMBB | Enhanced Mobile Broadband | |
| EMS | Element Management System | |
| eNB | evolved NodeB, E-UTRAN Node B | |
| EN-DC | E-UTRA-NR Dual Connectivity | |
| EPC | Evolved Packet Core | |
| EPDCCH | enhanced PDCCH, enhanced Physical Downlink Control Cannel | |
| EPRE | Energy per resource element | |
| EPS | Evolved Packet System | |
| EREG | enhanced REG, enhanced resource element groups | |
| ETSI | European Telecommunications Standards Institute | |
| ETWS | Earthquake and Tsunami Warning System | |
| eUICC | embedded UICC, embedded Universal Integrated Circuit Card | |
| E-UTRA | Evolved UTRA | |
| E-UTRAN | Evolved UTRAN | |
| EV2X | Enhanced V2X | |
| F1AP | F1 Application Protocol | |
| F1-C | F1 Control plane interface | |
| F1-U | F1 User plane interface | |
| FACCH | Fast Associated Control CHannel | |
| FACCH/F | Fast Associated Control Channel/Full rate | |
| FACCH/H | Fast Associated Control Channel/Half rate | |
| FACH | Forward Access Channel | |
| FAUSCH | Fast Uplink Signalling Channel | |
| FB | Functional Block | |
| FBI | Feedback Information | |
| FCC | Federal Communications Commission | |
| FCCH | Frequency Correction CHannel | |
| FDD | Frequency Division Duplex | |
| FDM | Frequency Division Multiplex | |
| FDMA | Frequency Division Multiple Access | |
| FE | Front End | |
| FEC | Forward Error Correction | |
| FFS | For Further Study | |
| FFT | Fast Fourier Transformation | |
| feLAA | further enhanced Licensed Assisted Access, further enhanced LAA | |
| FN | Frame Number | |
| FPGA | Field-Programmable Gate Array | |
| FR | Frequency Range | |
| G-RNTI | GERAN Radio Network Temporary Identity | |
| GERAN | GSM EDGE RAN, GSM EDGE Radio Access Network | |
| GGSN | Gateway GPRS Support Node | |
| GLONASS | GLObal'naya NAvigatsionnaya Sputnikovaya Sistema (Engl.: Global Navigation Satellite System) | |
| gNB | Next Generation NodeB | |
| gNB-CU | gNB-centralized unit, Next Generation NodeB centralized unit | |
| gNB-DU | gNB-distributed unit, Next Generation NodeB distributed unit | |
| GNSS | Global Navigation Satellite System | |
| GPRS | General Packet Radio Service | |
| GSM | Global System for Mobile Communications, Groupe Spécial Mobile | |
| GTP | GPRS Tunneling Protocol | |
| GTP-UGPRS | Tunnelling Protocol for User Plane | |
| GTS | Go To Sleep Signal (related to WUS) | |
| GUMMEI | Globally Unique MME Identifier | |
| GUTI | Globally Unique Temporary UE Identity | |
| HARQ | Hybrid ARQ, Hybrid Automatic Repeat Request | |
| HANDO | Handover | |
| HFN | HyperFrame Number | |
| HHO | Hard Handover | |
| HLR | Home Location Register | |
| HN | Home Network | |
| HO | Handover | |
| HPLMN | Home Public Land Mobile Network | |
| HSDPA | High Speed Downlink Packet Access | |
| HSN | Hopping Sequence Number | |
| HSPA | High Speed Packet Access | |
| HSS | Home Subscriber Server | |
| HSUPA | High Speed Uplink Packet Access | |
| HTTP | Hyper Text Transfer Protocol | |
| HTTPS | Hyper Text Transfer Protocol Secure (https is http/1.1 over SSL, i.e. port 443) | |
| I-Block | Information Block | |
| ICCID | Integrated Circuit Card Identification | |
| IAB | Integrated Access and Backhaul | |
| ICIC | Inter-Cell Interference Coordination | |
| ID | Identity, identifier | |
| IDFT | Inverse Discrete Fourier Transform | |
| IE | Information element | |
| IBE | In-Band Emission | |
| IEEE | Institute of Electrical and Electronics Engineers | |
| IEI | Information Element Identifier | |
| IEIDL | Information Element Identifier Data Length | |
| IETF | Internet Engineering Task Force | |
| IF | Infrastructure | |
| IM | Interference Measurement, Intermodulation, IP Multimedia | |
| IMC | IMS Credentials | |
| IMEI | International Mobile Equipment Identity | |
| IMGI | International mobile group identity | |
| IMPI | IP Multimedia Private Identity | |
| IMPU | IP Multimedia PUblic identity | |
| IMS | IP Multimedia Subsystem | |
| IMSI | International Mobile Subscriber Identity | |
| IoT | Internet of Things | |
| IP | Internet Protocol | |
| Ipsec | IP Security, Internet Protocol Security | |
| IP-CAN | IP-Connectivity Access Network | |
| IP-M | IP Multicast | |
| IPv4 | Internet Protocol Version 4 | |
| IPv6 | Internet Protocol Version 6 | |
| IR | Infrared | |
| IS | In Sync | |
| IRP | Integration Reference Point | |
| ISDN | Integrated Services Digital Network | |
| ISIM | IM Services Identity Module | |
| ISO | International Organisation for Standardisation | |

| | |
|---|---|
| ISP | Internet Service Provider |
| IWF | Interworking-Function |
| I-WLAN | Interworking WLAN Constraint length of the convolutional code, USIM Individual key |
| kB | Kilobyte (1000 bytes) |
| kbps | kilo-bits per second |
| Kc | Ciphering key |
| Ki | Individual subscriber authentication key |
| KPI | Key Performance Indicator |
| KQI | Key Quality Indicator |
| KSI | Key Set Identifier |
| ksps | kilo-symbols per second |
| KVM | Kernel Virtual Machine |
| L1 | Layer 1 (physical layer) |
| L1-RSRP | Layer 1 reference signal received power |
| L2 | Layer 2 (data link layer) |
| L3 | Layer 3 (network layer) |
| LAA | Licensed Assisted Access |
| LAN | Local Area Network |
| LBT | Listen Before Talk |
| LCM | LifeCycle Management |
| LCR | Low Chip Rate |
| LCS | Location Services |
| LCID | Logical Channel ID |
| LI | Layer Indicator |
| LLC | Logical Link Control, Low Layer Compatibility |
| LPLMN | Local PLMN |
| LPP | LTE Positioning Protocol |
| LSB | Least Significant Bit |
| LTE | Long Term Evolution |
| LWA | LTE-WLAN aggregation |
| LWIP | LTE/WLAN Radio Level Integration with IPsec Tunnel |
| LTE | Long Term Evolution |
| M2M | Machine-to-Machine |
| MAC | Medium Access Control (protocol layering context) |
| MAC | Message authentication code (security/encryption context) |
| MAC-A | MAC used for authentication and key agreement (TSG T WG3 context) |
| MAC-IMAC | used for data integrity of signalling messages (TSG T WG3 context) |
| MANO | Management and Orchestration |
| MBMS | Multimedia Broadcast and Multicast Service |
| MBSFN | Multimedia Broadcast multicast service Single Frequency Network |
| MCC | Mobile Country Code |
| MCG | Master Cell Group |
| MCOT | Maximum Channel Occupancy Time |
| MCS | Modulation and coding scheme |
| MDAF | Management Data Analytics Function |
| MDAS | Management Data Analytics Service |
| MDT | Minimization of Drive Tests |
| ME | Mobile Equipment |
| MeNB | master eNB |
| MER | Message Error Ratio |
| MGL | Measurement Gap Length |
| MGRP | Measurement Gap Repetition Period |
| MIB | Master Information Block, Management Information Base |
| MIMO | Multiple Input Multiple Output |
| MLC | Mobile Location Centre |
| MM | Mobility Management |
| MME | Mobility Management Entity |
| MN | Master Node |
| MnS | Management Service |
| MO | Measurement Object, Mobile Originated |
| MPBCH | MTC Physical Broadcast CHannel |
| MPDCCH | MTC Physical Downlink Control CHannel |
| MPDSCH | MTC Physical Downlink Shared CHannel |
| MPRACH | MTC Physical Random Access CHannel |
| MPUSCH | MTC Physical Uplink Shared Channel |
| MPLS | MultiProtocol Label Switching |
| MS | Mobile Station |
| MSB | Most Significant Bit |
| MSC | Mobile Switching Centre |
| MSI | Minimum System Information, Scheduling Information |
| MCH | |
| MSID | Mobile Station Identifier |
| MSIN | Mobile Station Identification Number |
| MSISDN | Mobile Subscriber ISDN Number |
| MT | Mobile Terminated, Mobile Termination |
| MTC | Machine-Type Communications mMTCmassive MTC, massive Machine-Type Communications |
| MU-MIMO | Multi User MIMO |
| MWUS | MTC wake-up signal, MTC WUS |
| NACK | Negative Acknowledgement |
| NAI | Network Access Identifier |
| NAS | Non-Access Stratum, Non-Access Stratum layer |
| NCT | Network Connectivity Topology |
| NC-JT | Non-Coherent Joint Transmission |
| NEC | Network Capability Exposure |
| NE-DC | NR-E-UTRA Dual Connectivity |
| NEF | Network Exposure Function |
| NF | Network Function |
| NFP | Network Forwarding Path |
| NFPD | Network Forwarding Path Descriptor |
| NFV | Network Functions Virtualization |
| NFVI | NFV Infrastructure |
| NFVO | NFV Orchestrator |
| NG | Next Generation, Next Gen |
| NGEN-DC | NG-RAN E-UTRA-NR Dual Connectivity |
| NM | Network Manager |
| NMS | Network Management System |
| N-PoP | Network Point of Presence |
| NMIB, N-MIB | Narrowband MIB |
| NPBCH | Narrowband Physical Broadcast CHannel |
| NPDCCH | Narrowband Physical Downlink Control CHannel |
| NPDSCH | Narrowband Physical Downlink Shared CHannel |
| NPRACH | Narrowband Physical Random Access CHannel |
| NPUSCH | Narrowband Physical Uplink Shared CHannel |
| NPSS | Narrowband Primary Synchronization Signal |
| NSSS | Narrowband Secondary Synchronization Signal |
| NR | New Radio, Neighbour Relation |
| NRF | NF Repository Function |
| NRS | Narrowband Reference Signal |
| NS | Network Service |
| NSA | Non-Standalone operation mode |
| NSD | Network Service Descriptor |
| NSR | Network Service Record |
| NSSAI | Network Slice Selection Assistance Information |
| S-NNSAI | Single-NSSAI |
| NSSF | Network Slice Selection Function |
| NW | Network |
| NWUS | Narrowband wake-up signal, Narrowband WUS |

-continued

| | |
|---|---|
| NZP | Non-Zero Power |
| O&M | Operation and Maintenance |
| ODU2 | Optical channel Data Unit - type 2 |
| OFDM | Orthogonal Frequency Division Multiplexing |
| OFDMA | Orthogonal Frequency Division Multiple Access |
| OOB | Out-of-band |
| OOS | Out of Sync |
| OPEX | OPerating EXpense |
| OSI | Other System Information |
| OSS | Operations Support System |
| OTA | over-the-air |
| PAPR | Peak-to-Average Power Ratio |
| PAR | Peak to Average Ratio |
| PBCH | Physical Broadcast Channel |
| PC | Power Control, Personal Computer |
| PCC | Primary Component Carrier, Primary CC |
| PCell | Primary Cell |
| PCI | Physical Cell ID, Physical Cell Identity |
| PCEF | Policy and Charging Enforcement Function |
| PCF | Policy Control Function |
| PCRF | Policy Control and Charging Rules Function |
| PDCP | Packet Data Convergence Protocol, Packet Data Convergence Protocol layer |
| PDCCH | Physical Downlink Control Channel |
| PDCP | Packet Data Convergence Protocol |
| PDN | Packet Data Network, Public Data Network |
| PDSCH | Physical Downlink Shared Channel |
| PDU | Protocol Data Unit |
| PEI | Permanent Equipment Identifiers |
| PFD | Packet Flow Description |
| P-GW | PDN Gateway |
| PHICH | Physical hybrid-ARQ indicator channel |
| PHY | Physical layer |
| PLMN | Public Land Mobile Network |
| PIN | Personal Identification Number |
| PM | Performance Measurement |
| PMI | Precoding Matrix Indicator |
| PNF | Physical Network Function |
| PNFD | Physical Network Function Descriptor |
| PNFR | Physical Network Function Record |
| POC | PTT over Cellular |
| PP, PTP | Point-to-Point |
| PPP | Point-to-Point Protocol |
| PRACH | Physical RACH |
| PRB | Physical resource block |
| PRG | Physical resource block group |
| ProSe | Proximity Services, Proximity-Based Service |
| PRS | Positioning Reference Signal |
| PRR | Packet Reception Radio |
| PS | Packet Services |
| PSBCH | Physical Sidelink Broadcast Channel |
| PSDCH | Physical Sidelink Downlink Channel |
| PSCCH | Physical Sidelink Control Channel |
| PSFCH | Physical Sidelink Feedback Channel |
| PSSCH | Physical Sidelink Shared Channel |
| PSCell | Primary SCell |
| PSS | Primary Synchronization Signal |
| PSTN | Public Switched Telephone Network |
| PT-RS | Phase-tracking reference signal |
| PTT | Push-to-Talk |
| PUCCH | Physical Uplink Control Channel |
| PUSCH | Physical Uplink Shared Channel |
| QAM | Quadrature Amplitude Modulation |
| QCI | QoS class of identifier |
| QCL | Quasi co-location |
| QFI | QoS Flow ID, QoS Flow Identifier |
| QoS | Quality of Service |
| QPSK | Quadrature (Quaternary) Phase Shift Keying |

-continued

| | |
|---|---|
| QZSS | Quasi-Zenith Satellite System |
| RA-RNTI | Random Access RNTI |
| RAB | Radio Access Bearer, Random Access Burst |
| RACH | Random Access Channel |
| RADIUS | Remote Authentication Dial In User Service |
| RAN | Radio Access Network |
| RAND | RANDom number (used for authentication) |
| RAR | Random Access Response |
| RAT | Radio Access Technology |
| RAU | Routing Area Update |
| RB | Resource block, Radio Bearer |
| RBG | Resource block group |
| REG | Resource Element Group |
| Rel | Release |
| REQ | REQuest |
| RF | Radio Frequency |
| RI | Rank Indicator |
| RIV | Resource indicator value |
| RL | Radio Link |
| RLC | Radio Link Control, Radio Link Control layer |
| RLC AM | RLC Acknowledged Mode |
| RLC UM | RLC Unacknowledged Mode |
| RLF | Radio Link Failure |
| RLM | Radio Link Monitoring |
| RLM-RS | Reference Signal for RLM |
| RM | Registration Management |
| RMC | Reference Measurement Channel |
| RMSI | Remaining MSI, Remaining Minimum System Information |
| RN | Relay Node |
| RNC | Radio Network Controller |
| RNL | Radio Network Layer |
| RNTI | Radio Network Temporary Identifier |
| ROHC | RObust Header Compression |
| RRC | Radio Resource Control, Radio Resource Control layer |
| RRM | Radio Resource Management |
| RS | Reference Signal |
| RSRP | Reference Signal Received Power |
| RSRQ | Reference Signal Received Quality |
| RSSI | Received Signal Strength Indicator |
| RSU | Road Side Unit |
| RSTD | Reference Signal Time difference |
| RTP | Real Time Protocol |
| RTS | Ready-To-Send |
| RTT | Round Trip Time |
| Rx | Reception, Receiving, Receiver |
| S1AP | S1 Application Protocol |
| S1-MME | S1 for the control plane |
| S1-U | S1 for the user plane |
| S-GW | Serving Gateway |
| S-RNTI | SRNC Radio Network Temporary Identity |
| S-TMSI | SAE Temporary Mobile Station Identifier |
| SA | Standalone operation mode |
| SAE | System Architecture Evolution |
| SAP | Service Access Point |
| SAPD | Service Access Point Descriptor |
| SAPI | Service Access Point Identifier |
| SCC | Secondary Component Carrier, Secondary CC |
| SCell | Secondary Cell |
| SC-FDMA | Single Carrier Frequency Division Multiple Access |
| SCG | Secondary Cell Group |
| SCM | Security Context Management |
| SCS | Subcarrier Spacing |
| SCTP | Stream Control Transmission Protocol |
| SDAP | Service Data Adaptation Protocol, Service Data Adaptation Protocol layer |
| SDL | Supplementary Downlink |
| SDNF | Structured Data Storage Network Function |
| SDP | Session Description Protocol |

-continued

| | |
|---|---|
| SDSF | Structured Data Storage Function |
| SDU | Service Data Unit |
| SEAF | Security Anchor Function |
| SeNB | secondary eNB |
| SEPP | Security Edge Protection Proxy |
| SFI | Slot format indication |
| SFTD | Space-Frequency Time Diversity, SFN and frame timing difference |
| SFN | System Frame Number or Single Frequency Network |
| SgNB | Secondary gNB |
| SGSN | Serving GPRS Support Node |
| S-GW | Serving Gateway |
| SI | System Information |
| SI-RNTI | System Information RNTI |
| SIB | System Information Block |
| SIM | Subscriber Identity Module |
| SIP | Session Initiated Protocol |
| SiP | System in Package |
| SL | Sidelink |
| SLA | Service Level Agreement |
| SM | Session Management |
| SMF | Session Management Function |
| SMS | Short Message Service |
| SMSF | SMS Function |
| SMTC | SSB-based Measurement Timing Configuration |
| SN | Secondary Node, Sequence Number |
| SoC | System on Chip |
| SON | Self-Organizing Network |
| SpCell | Special Cell |
| SP-CSI-RNTI | Semi-Persistent CSI RNTI |
| SPS | Semi-Persistent Scheduling |
| SQN | Sequence number |
| SR | Scheduling Request |
| SRB | Signalling Radio Bearer |
| SRS | Sounding Reference Signal |
| SS | Synchronization Signal |
| SSB | SS Block |
| SSBRI | SSB Resource Indicator |
| SSC | Session and Service Continuity |
| SS-RSRP | Synchronization Signal based Reference Signal Received Power |
| SS-RSRQ | Synchronization Signal based Reference Signal Received Quality |
| SS-SINR | Synchronization Signal based Signal to Noise and Interference Ratio |
| SSS | Secondary Synchronization Signal |
| SSSG | Search Space Set Group |
| SSSIF | Search Space Set Indicator |
| SST | Slice/Service Types |
| SU-MIMO | Single User MIMO |
| SUL | Supplementary Uplink |
| TA | Timing Advance, Tracking Area |
| TAC | Tracking Area Code |
| TAG | Timing Advance Group |
| TAU | Tracking Area Update |
| TB | Transport Block |
| TBS | Transport Block Size |
| TBD | To Be Defined |
| TCI | Transmission Configuration Indicator |
| TCP | Transmission Communication Protocol |
| TDD | Time Division Duplex |
| TDM | Time Division Multiplexing |
| TDMA | Time Division Multiple Access |
| TE | Terminal Equipment |
| TEID | Tunnel End Point Identifier |
| TFT | Traffic Flow Template |
| TMSI | Temporary Mobile Subscriber Identity |
| TNL | Transport Network Layer |
| TPC | Transmit Power Control |
| TPMI | Transmitted Precoding Matrix Indicator |
| TR | Technical Report |
| TRP, TRxP | Transmission Reception Point |
| TRS | Tracking Reference Signal |
| TRx | Transceiver |
| TS | Technical Specifications, Technical Standard |
| TTI | Transmission Time Interval |

-continued

| | |
|---|---|
| Tx | Transmission, Transmitting, Transmitter |
| U-RNTI | UTRAN Radio Network Temporary Identity |
| UART | Universal Asynchronous Receiver and Transmitter |
| UCI | Uplink Control Information |
| UE | User Equipment |
| UDM | Unified Data Management |
| UDP | User Datagram Protocol |
| UDR | Unified Data Repository |
| UDSF | Unstructured Data Storage Network Function |
| UICC | Universal Integrated Circuit Card |
| UL | Uplink |
| UM | Unacknowledged Mode |
| UML | Unified Modelling Language |
| UMTS | Universal Mobile Telecommunications System |
| UP | User Plane |
| UPF | User Plane Function |
| URI | Uniform Resource Identifier |
| URL | Uniform Resource Locator |
| URLLC | Ultra-Reliable and Low Latency |
| USB | Universal Serial Bus |
| USIM | Universal Subscriber Identity Module |
| USS | UE-specific search space |
| UTRA | UMTS Terrestrial Radio Access |
| UTRAN | Universal Terrestrial Radio Access Network |
| UwPTS | Uplink Pilot Time Slot |
| V2I | Vehicle-to-Infrastructure |
| V2P | Vehicle-to-Pedestrian |
| V2V | Vehicle-to-Vehicle |
| V2X | Vehicle-to-everything |
| VIM | Virtualized Infrastructure Manager |
| VL | Virtual Link, VLAN Virtual LAN, Virtual Local Area Network |
| VM | Virtual Machine |
| VNF | Virtualized Network Function |
| VNFFG | VNF Forwarding Graph |
| VNFFGD | VNF Forwarding Graph Descriptor |
| VNFM | VNF Manager |
| VoIP | Voice-over-IP, Voice-over- Internet Protocol |
| VPLMN | Visited Public Land Mobile Network |
| VPN | Virtual Private Network |
| VRB | Virtual Resource Block |
| WiMAX | Worldwide Interoperability for Microwave Access |
| WLAN | Wireless Local Area Network |
| WMAN | Wireless Metropolitan Area Network |
| WPAN | Wireless Personal Area Network |
| X2-C | X2-Control plane |
| X2-U | X2-User plane |
| XML | extensible Markup Language |
| XRES | Expected user RESponse |
| XOR | exclusive OR |
| ZC | Zadoff-Chu |
| ZP | Zero Power |

Terminology

For the purposes of the present document, the following terms and definitions are applicable to the examples and embodiments discussed herein.

The term "circuitry" as used herein refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, and/or transferring digital data. Processing circuitry may include one or more processing cores to execute instructions and one or more memory structures to store program and data information. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes. Processing circuitry may include more hardware accelerators, which may be microprocessors, programmable processing devices, or the like. The one or more hardware accelerators may include, for example, computer vision (CV) and/or deep learning (DL) accelerators. The terms "application circuitry" and/or "baseband circuitry" may be considered synonymous to, and may be referred to as, "processor circuitry."

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, and/or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "network element" as used herein refers to physical or virtualized equipment and/or infrastructure used to provide wired or wireless communication network services. The term "network element" may be considered synonymous to and/or referred to as a networked computer, networking hardware, network equipment, network node, router, switch, hub, bridge, radio network controller, RAN device, RAN node, gateway, server, virtualized VNF, NFVI, and/or the like.

The term "computer system" as used herein refers to any type interconnected electronic devices, computer devices, or components thereof. Additionally, the term "computer system" and/or "system" may refer to various components of a computer that are communicatively coupled with one another. Furthermore, the term "computer system" and/or "system" may refer to multiple computer devices and/or multiple computing systems that are communicatively coupled with one another and configured to share computing and/or networking resources.

The term "appliance," "computer appliance," or the like, as used herein refers to a computer device or computer system with program code (e.g., software or firmware) that is specifically designed to provide a specific computing resource. A "virtual appliance" is a virtual machine image to be implemented by a hypervisor-equipped device that virtualizes or emulates a computer appliance or otherwise is dedicated to provide a specific computing resource.

The term "resource" as used herein refers to a physical or virtual device, a physical or virtual component within a computing environment, and/or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, and/or the like. A "hardware resource" may refer to compute, storage, and/or network resources provided by physical hardware element(s). A "virtualized resource" may refer to compute, storage, and/or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing and/or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" as used herein refers to a connection between two devices through a RAT for the purpose of transmitting and receiving information.

The terms "instantiate," "instantiation," and the like as used herein refers to the creation of an instance. An "instance" also refers to a concrete occurrence of an object, which may occur, for example, during execution of program code.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or link, and/or the like.

The term "information element" refers to a structural element containing one or more fields. The term "field" refers to individual contents of an information element, or a data element that contains content.

The term "SMTC" refers to an SSB-based measurement timing configuration configured by SSB-MeasurementTimingConfiguration.

The term "SSB" refers to an SS/PBCH block.

The term "a "Primary Cell" refers to the MCG cell, operating on the primary frequency, in which the UE either performs the initial connection establishment procedure or initiates the connection re-establishment procedure.

The term "Primary SCG Cell" refers to the SCG cell in which the UE performs random access when performing the Reconfiguration with Sync procedure for DC operation.

The term "Secondary Cell" refers to a cell providing additional radio resources on top of a Special Cell for a UE configured with CA.

The term "Secondary Cell Group" refers to the subset of serving cells comprising the PSCell and zero or more secondary cells for a UE configured with DC.

The term "Serving Cell" refers to the primary cell for a UE in RRC_CONNECTED not configured with CA/DC there is only one serving cell comprising of the primary cell.

The term "serving cell" or "serving cells" refers to the set of cells comprising the Special Cell(s) and all secondary cells for a UE in RRC_CONNECTED configured with CA/.

The term "Special Cell" refers to the PCell of the MCG or the PSCell of the SCG for DC operation; otherwise, the term "Special Cell" refers to the Pcell.

What is claimed is:

1. An apparatus comprising:
memory to store first radio access network (RAN) measurements associated with a first RAN and second RAN measurements associated with a second RAN, wherein the first RAN is a cellular RAN; and
processing circuitry, coupled with the memory, that configures the apparatus to:
communicate an access traffic steering switching splitting (ATSSS) Capability message in a packet data unit (PDU) session establishment message, the ATSSS Capability message indicating which steering modes are supported by a user equipment (UE) and whether the UE supports receiving ATSSS rule updates over Protected Management Frames (PMF) messaging;
retrieve the first and second RAN measurements from the memory; and
determine a traffic distribution to distribute traffic of the UE between the first RAN and the second RAN for ATSSS based on the first and second RAN measurements and an ATSSS steering mode, the ATSSS steering mode selected based on the ATSSS Capability message.

2. The apparatus of claim 1, wherein the first RAN measurements include measurements received from a next generation RAN (NG-RAN) node or the UE.

3. The apparatus of claim 1, wherein the first RAN measurements include measurements received from the second RAN or the UE.

4. The apparatus of claim 1, wherein the second RAN is a wireless local area network (WLAN).

5. The apparatus of claim 1, wherein the ATSSS steering mode is a load-balancing mode, a priority-based mode, or a dynamic traffic steering mode.

6. The apparatus of claim 1, wherein the processing circuitry is further configures the apparatus to retrieve session management subscription data that includes information to indicate one or more allowed steering modes.

7. The apparatus of claim 6, wherein the information in the session management subscription data includes a single indicator that is to indicate whether or not ATSSS steering modes based on RAN measurements are allowed.

8. The apparatus of claim 6, wherein the information in the session management subscription data includes separate indicators to indicate whether RAN measurement-based steering is allowed for different respective steering modes.

9. The apparatus of claim 1, wherein the processing circuitry configures the apparatus to determine the traffic distribution through an update of one or more ATSSS rules or N4 rules.

10. The apparatus of claim 1, wherein the processing circuitry configures the apparatus to:
receive, from the first RAN, measurement assistance information (MAI) that specifies which set of RAN measurements are to be performed, whether the set of RAN measurements are to be performed periodically or on demand, and a periodicity for measurement reporting for periodic performance of the set of RAN measurements;
perform the set of RAN measurements; and
report the set of RAN measurements as indicated in the MAI.

11. One or more non-transitory computer-readable media storing instructions that, when executed by one or more processors, configures a user equipment (UE) to:
receive, from a network entity, measurement assistance information (MAI) that indicates one or more measurements to be performed and on which of different types of networks to perform the one or more measurements and that measurement reports are be sent to the network entity from which the MAI was received; and
in response to the MAI, encode a measurement report, that includes measurement elements based on the one or more measurements, for transmission to a user plane function (UPF) in the network from which the MAI was received.

12. The one or more non-transitory computer-readable media of claim 11, wherein the measurement report is a UE access traffic steering switching splitting (ATSSS) radio access network (RAN) measurement report.

13. The one or more non-transitory computer-readable media of claim 11, wherein the measurement report includes a UE RAN measurement element for new radio (NR) access or wireless local area network (WLAN) access.

14. The one or more non-transitory computer-readable media of claim 11, wherein the media further stores instructions that configure the UE to:
receive, from the UPF, a UE ATSSS rule update request message;
update a rule based on the UE ATSSS rule update request message; and
encode a UE ATSSS rule update complete message for transmission to the UPF.

15. One or more non-transitory computer-readable media storing instructions that, when executed by one or more processors, configure a user equipment (UE) to:
send an access traffic steering switching splitting (ATSSS) Capability message in a packet data unit (PDU) session establishment message to an Access and Mobility Management Function (AMF) in a next generation (NG) network, the ATSSS Capability message indicating which steering modes are supported by the UE and whether the UE supports receiving ATSSS rule updates over Protected Management Frames (PMF) messaging;

in response to the PDU session establishment message, receive a PDU session establishment accept message from the AMF, the PDU session establishment accept message indicating that a PDU session has been successfully established and providing ATSSS rules;

receive measurement assistance information (MAI) that indicates on which radio access network (RAN) measurements are to be performed;

perform the RAN measurements as indicated in the MAI; and report the RAN measurements using a traffic distribution between different RANs as indicated by the MAI based on the RAN measurements and an ATSSS steering mode selected based on the ATSSS Capability message and ATSSS rules.

16. The one or more non-transitory computer-readable media of claim 15, wherein:

the PDU session establishment accept message indicates session parameters that include the ATSSS rules, internet protocol (IP) address, and Quality of Service (QOS), and selection of the ATSSS rules is based on the ATSSS Capability message.

17. The one or more non-transitory computer-readable media of claim 15, wherein the media further stores instructions that configure the UE to initiate or respond to a multi-access (MA) PDU session modification request to dynamically update at least one of ATSSS Capability, MAI, or ATSSS rules during the PDU session.

18. The one or more non-transitory computer-readable media of claim 15, wherein the MAI indicates that the RAN measurements are to be performed periodically or on demand, and, for the RAN measurements that are to be performed periodically, a periodicity for measurement and reporting.

19. The one or more non-transitory computer-readable media of claim 15, wherein the MAI indicates that the RAN measurements are to be collected and reported for trusted wireless local area network (WLAN) access, the RAN measurements provided from a trusted WLAN access point (AP) or trusted WLAN gateway (TNGF) to a user plane function (UPF) for ATSSS rule determination.

20. The one or more non-transitory computer-readable media of claim 15, wherein the MAI indicates that the RAN measurements are to be collected and reported for untrusted WLAN access, the RAN measurements provided from an untrusted WLAN access point to a user plane function (UPF) for ATSSS rule determination.

21. The one or more non-transitory computer-readable media of claim 15, wherein the MAI indicates that a wireless local area network (WLAN) measurement report is transmitted to a user plane function (UPF), and updated access traffic steering switching splitting (ATSSS) rules received from the UPF based on the WLAN measurement report.

* * * * *